(12) United States Patent
Pantel

(10) Patent No.: US 9,431,056 B2
(45) Date of Patent: Aug. 30, 2016

(54) SELECTIVE SHINGLED MAGNETIC RECORDING SCHEME

(71) Applicant: Lothar Pantel, Neckargemuend (DE)

(72) Inventor: Lothar Pantel, Neckargemuend (DE)

(73) Assignee: inodyn NewMedia GmbH, Neckargemuend (DE)

( * ) Notice: Subject to any disclaimer, the term of this patent is extended or adjusted under 35 U.S.C. 154(b) by 0 days.

(21) Appl. No.: 15/013,868

(22) Filed: Feb. 2, 2016

(65) Prior Publication Data

US 2016/0155471 A1 Jun. 2, 2016

Related U.S. Application Data

(63) Continuation of application No. 14/575,969, filed on Dec. 18, 2014.

(30) Foreign Application Priority Data

Dec. 23, 2013 (DE) .................. 10 2013 022 051

(51) Int. Cl.
*G11B 20/12* (2006.01)
*G11B 20/18* (2006.01)
*G11B 20/20* (2006.01)
*G11B 5/00* (2006.01)

(52) U.S. Cl.
CPC ....... *G11B 20/1889* (2013.01); *G11B 20/1217* (2013.01); *G11B 20/1252* (2013.01); *G11B 20/1816* (2013.01); *G11B 20/20* (2013.01); *G11B 2005/0002* (2013.01); *G11B 2020/1238* (2013.01); *G11B 2020/1241* (2013.01); *G11B 2020/1277* (2013.01); *G11B 2020/1292* (2013.01)

(58) Field of Classification Search
CPC .......... G11B 19/048; G11B 20/00963; G11B 2020/1826; G11B 20/12; G11B 20/1217; G11B 2005/0002; G11B 2020/1292; G11B 20/00572; G11B 2020/1277
USPC ........................... 360/48; 369/53.15; 702/35
See application file for complete search history.

(56) References Cited

U.S. PATENT DOCUMENTS

| | | | |
|---|---|---|---|
| 7,408,731 B2 | 8/2008 | Uemura et al. | |
| 7,443,625 B2 | 10/2008 | Hamaguchi et al. | |
| 8,179,627 B2 | 5/2012 | Chang et al. | |
| 8,223,458 B2 | 7/2012 | Mochizuki et al. | |
| 8,432,633 B2 | 4/2013 | Grobis et al. | |
| 8,625,215 B1 * | 1/2014 | Burd ............................... 360/31 |
| 8,693,133 B1 | 4/2014 | Lee et al. | |
| 8,699,185 B1 | 4/2014 | Teh et al. | |
| 8,756,399 B2 | 6/2014 | Feldman | |
| 8,837,069 B2 | 9/2014 | Song | |
| 8,908,310 B1 | 12/2014 | Bai et al. | |

(Continued)

*Primary Examiner* — Thomas Alunkal

(57) ABSTRACT

A selective band management scheme for storage devices is disclosed that may be used in connection with shingled magnetic recording (SMR). SMR uses bands consisting of tracks separated by guard regions. The replacement of a defective sector may be attained by selecting a suitable guard region and by displacing the selected guard region onto the physical location of the defective sector. The boundaries of the bands may be shifted. The portion of the disk surface that is necessary for the guard regions may simultaneously function as a spare sector area for defective sectors without additional space requirements. In at least one embodiment, guard regions are selectively placed onto tracks with an elevated number of primary defects by means of an optimization algorithm.

25 Claims, 21 Drawing Sheets

(56) References Cited

U.S. PATENT DOCUMENTS

| | | |
|---|---|---|
| 8,941,943 B1 | 1/2015 | Coker et al. |
| 8,988,800 B1 | 3/2015 | Varnica et al. |
| 9,007,710 B1 | 4/2015 | Liu et al. |
| 9,036,284 B1 | 5/2015 | Feldman |
| 2002/0159376 A1* | 10/2002 | Ohsawa ............. G11B 7/00736 369/111 |
| 2007/0183071 A1* | 8/2007 | Uemura ................... G11B 5/09 360/48 |
| 2007/0223132 A1* | 9/2007 | Tsuchinaga ........ G11B 20/1258 360/75 |
| 2009/0055620 A1* | 2/2009 | Feldman ................ B82Y 25/00 711/202 |
| 2011/0304935 A1* | 12/2011 | Chang .................... G11B 5/012 360/48 |
| 2012/0082019 A1 | 4/2012 | Harigae |
| 2012/0233432 A1 | 9/2012 | Feldman et al. |
| 2012/0300325 A1 | 11/2012 | Hall |
| 2013/0117520 A1 | 5/2013 | Ryu |
| 2013/0148225 A1 | 6/2013 | Coker et al. |
| 2013/0170061 A1 | 7/2013 | Saito et al. |
| 2014/0006707 A1 | 1/2014 | Bandic et al. |
| 2015/0062739 A1 | 3/2015 | Kumagai et al. |
| 2015/0109700 A1 | 4/2015 | Kashiwase et al. |
| 2016/0012849 A1* | 1/2016 | Feldman ................. G06F 3/0608 360/48 |

\* cited by examiner

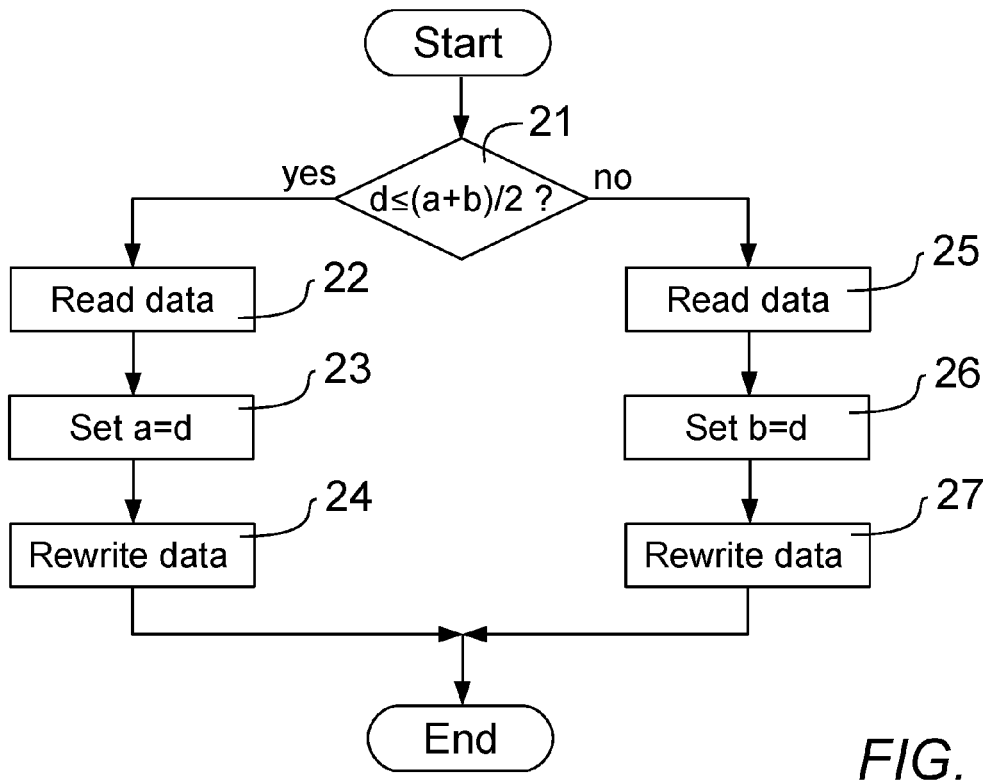

US 9,431,056 B2

SELECTIVE SHINGLED MAGNETIC RECORDING SCHEME

CROSS-REFERENCE TO RELATED APPLICATIONS

This application is a continuation of U.S. patent application Ser. No. 14/575,969, filed Dec. 18, 2014, which claims priority from German patent application DE102013022051.3, filed Dec. 23, 2013. The entire disclosure of both prior applications is expressly incorporated herein by reference. This application claims the benefit of U.S. patent application Ser. No. 14/575,969 and claims priority to German patent application DE 102013022051.3, filed Dec. 23, 2013.

TECHNICAL FIELD

The present invention relates to the field of data storage and, in particular, to a selective shingled magnetic recording scheme that involves designating selected tracks as guard regions between bands of variable size.

BACKGROUND OF THE INVENTION

Common hard disk drives are storage devices comprising disks whose data-carrying surfaces are coated with a magnetic layer. Typically, the disks are positioned atop one another on a disk stack (platters) and rotate around an axis, or spindle. To store data, each disk surface is organized in a plurality of circular, concentric tracks. Groups of concentric tracks placed atop each other in the disk stack are called cylinders. Read/write heads, each containing a read element and a write element, are mounted on an actuator arm and are moved over the spinning disks to a selected track, where the data transfer occurs. The actuator arm is controlled by a hard disk controller, an internal logic responsible for read and write access.

Each track on a disk surface is divided into sections, or segments, known as physical sectors (which must not be confused with the geometrical circle sector). A physical sector, also referred to as a data block or sector data, typically stores a data unit of 512 bytes or 4 KB of user data.

A disk surface may be divided into zones. Zones are regions wherein each track comprises the same number of physical sectors. From the outside inward, the number of physical sectors per track may decrease from zone to zone. This approach is known as zone bit recording.

The storage capacity of a hard disk drive can be increased, inter alia, by reducing the track pitch (i.e., track width) of the concentric tracks on the disk surfaces. This requires a decrease in the size of the read and write elements. However, without new storage technologies, a reduction in the size of the write elements is questionable, as the magnetic field that can be generated is otherwise too small to adequately magnetize the individual bits on the disk surface. A known solution is the shingled magnetic recording (SMR) methodology, by which a write element writes data tracks in an overlapping fashion.

With SMR, overlapping data tracks are grouped into bands, which are separated by inter-band gaps, also known as "guard bands," "guard regions," "guard tracks," or "guard segments." Typically, to change the contents of a first track in an already populated band, it is necessary to read out and buffer all subsequent tracks of the band because after updating the data on that first track, rewriting the buffered data up to the next guard region is unavoidable as the wide write element will inevitably overwrite the data of each subsequent track. Due to the sequential and overlapping structure of SMR, even a small change to the contents stored in a band can result in a significant increase in the amount of data that must be read and written, thus leading to significant delays. Such a process is referred to as "read-modify-write" or "write amplification." Further information pertaining to shingled magnetic recording can be found in U.S. Pat. No. 8,223,458 B2, U.S. Pat. No. 8,432,633 B2, and U.S. Pat. No. 8,179,627 B2, as well as in patent applications US2012/0082019 A1 and US2013/0148225 A1.

A computer, or host, accessing a hard disk drive may use logical block addresses (LBAs) in commands to read and write sector data without regard for the actual locations of the physical sectors on the disc surfaces. By means of a hard disk controller the logical block addresses (LBAs) can be mapped to physical block addresses (PBAs) representing the physical locations of sector data. Different mapping techniques for an indirect LBA-to-PBA read and write access are known in the prior art. In some embodiments LBA-to-PBA mapping does not change often. In other embodiments the LBA-to-PBA mapping may change with every write operation, the physical sectors being assigned dynamically.

Sector data read from a physical sector may be subjected to a forward error correction. For this purpose, additional error-correcting codes may be included in the data stored on the physical sector. The hard disk controller may monitor whether physical sectors are poorly legible, e.g., by means of the information derived from the forward error correction. If a physical sector is no longer legible, the hard disk controller may report a CRC error.

A physical sector that is poorly legible or no longer legible is sometimes called a "bad sector" and will be referred to herein as unreliable or defective sector. Hard disk drives may autonomously "repair" defective sectors during regular operation by means of defect management. A defective sector may be replaced by a spare sector from a spare sector area that has been reserved for this purpose. The reference to the spare sector may be stored in a G-list (grown defects list). This is referred to as G-list remapping. Defect management processes may be logged by a monitoring system such as S.M.A.R.T. (Self-Monitoring, Analysis and Reporting Technology).

Moreover, when producing a hard disk drive, the manufacturer may recognize unreliable or defective sectors on the disk surfaces that can be mapped out by means of a P-list (primary defects list) so that the hard disk drive skips these unreliable or defective sections. This is referred to as "sector slipping" or just "slipping."

In the cases of both G-list remapping (grown defects) and P-list remapping (primary defects), mapping out the defects may be achieved by changing the association between the logical block addresses (LBAs) and the physical block addresses (PBAs) of the affected physical sectors. To the computer or host, the logical blocks still appear to be error-free. Remapped sector data may, nevertheless, affect the access time in some embodiments and, as soon as all spare sectors from the spare sector areas are in use, it is time to replace the hard disk drive.

U.S. Pat. No. 7,408,731 B2, entitled "Track allocation method of disk drive," describes a disk surface having at least two types of track widths, i.e., an area with overlapping tracks ("shingled tracks," ST) and an area with conventional, non-overlapping tracks ("tiled track," TT). Storage space that is missing due to a defective track is regained by adding additional overlapping and thus space-saving tracks to the "shingled tracks" area (ST). Defective tracks are simply skipped while writing the bands.

SUMMARY OF THE INVENTION

Aspects of the present disclosure are directed to the management of unreliable or defective sections on a data carrier surface, such as a defective track or one or more defective physical sectors. In accordance with the claims, a data carrier surface or a comparable storage device is configured for overlapping data tracks at least in an area. At least one guard region, guard track, or guard segment is placed onto the physical location of an unreliable or defective section, to such an extent that the guard region, guard track, or guard segment completely or at least partially covers the unreliable or defective section.

In some embodiments, the replacement of an unreliable or defective sector may be attained by repositioning an existing guard region onto the physical position of the track (or tracks) affected by the unreliable or defective sector (or sectors) and by shifting the boundaries of the bands to the new position of the repositioned guard region. This may result in bands with a variable number of tracks, separated by the track (or tracks) affected by the unreliable or defective sector (or sectors), which now acts as a guard region.

In at least one embodiment, an additional guard region may be positioned on a defective track or on several adjacent defective tracks, i.e., tracks with unreliable or defective sectors. This may be done to reduce the write amplification. In other embodiments, guard regions may be placed onto tracks with elevated numbers of primary defects. This may be done during the production of the hard disk drive at the manufacturer.

The aforementioned and many further aspects, variants, objectives, and advantages of the invention will be comprehensible to those skilled in the art after reading detailed descriptions of the embodiments.

BRIEF DESCRIPTION OF THE DRAWINGS

Further features, advantages, and potential applications will be apparent from the drawings. All described and/or illustrated features, alone or in any combination, independent of the synopsis in individual claims, constitute the subject matter of the invention.

FIG. 11 shows a G-list table for the reconfiguration of bands (as per FIG. 5 and FIG. 6).

FIG. 12 shows a G-list table for the reconfiguration of bands (as per FIG. 9 and FIG. 10).

FIG. 13 is a flowchart according to a first embodiment.

DETAILED DESCRIPTION OF THE INVENTION

Figure 1:
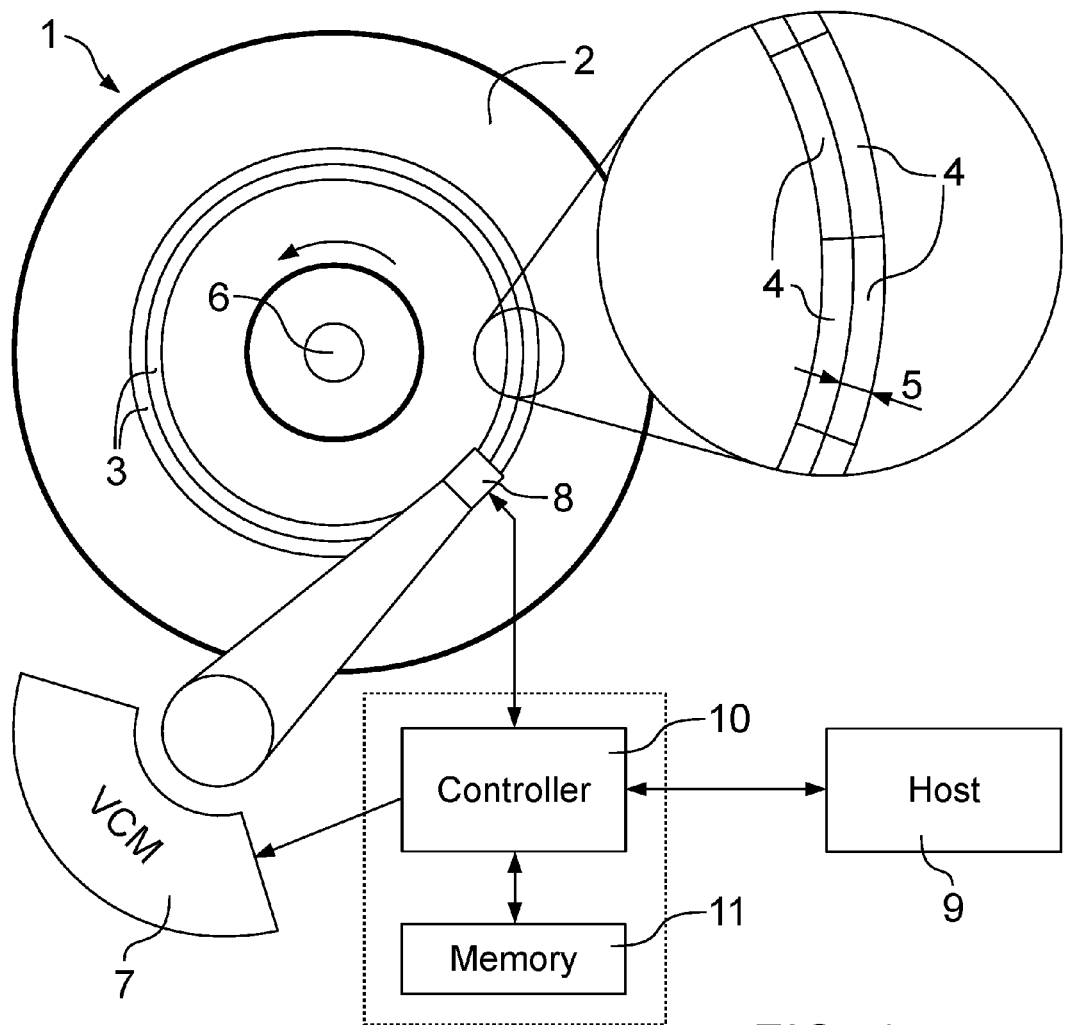
FIG. 1 shows a hard disk drive.

FIG. 1 shows a SMR hard disk drive 1 as an example of a storage device. The disks, with magnetic layers on their disk surfaces 2, spin around the rotational axis of the spindle 6, upon which the individual disks are mounted. Tracks 3 on the disk surfaces 2 are divided into sections, or segments, referred to herein as physical sectors 4, or sectors 4.

To perform read and write operations, the read/write heads 8 are shifted by an actuator arm to the desired track 3. The actuator arm is moved by an actuator 7, typically a voice coil motor (VCM). The actuator 7 is controlled by a hard disk controller 10. The hard disk controller 10 communicates with a host system 9 and has access to a memory, or cache 11. The memory, or cache 11 may, inter alia, contain a P-list and a G-list and may buffer data of tracks 3 or sectors 4.

Figure 2:
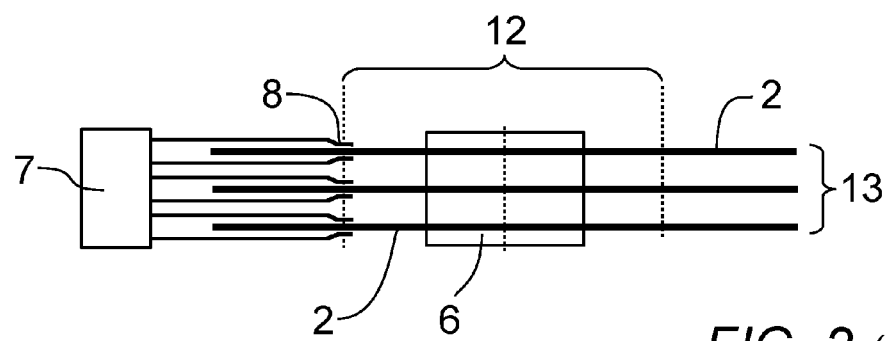
FIG. 2 illustrates the disk stack of the hard disk drive in profile.

FIG. 2 shows a side view of a disk stack 13 (platters), which in this example, comprises three disks, or six disk surfaces 2, as each disk, having upper and lower sides, has two magnetic layers. Cylinder 12 encompasses all concentric tracks 3 that are atop each other in the disk stack 13.

For shingled magnetic recording, the tracks 3 on the disk surfaces 2 are grouped in bands 18. This is demonstrated in FIG. 3, which shows an enlarged, sectional view of a band 18, comprising eight tracks 3. In the present disclosure, the tracks 3 are numbered according to the scheme n, n+1, n+2, etc., indicating that the tracks 3 and the bands 18 can be located at any suitable position on a disk surface 2.

The read/write head 8 comprises a write element 15 and a read element 16. In accordance with the principle of shingled magnetic recording, the width of the write element 15 exceeds the width of the read element 16. In the particular example, as per FIG. 3, the write element 15 is twice as wide as the read element 16. The arrow 19 indicates the relative direction of motion of the read/write head 8. The write element 15 writes overlapping data tracks 17, which are depicted with a pattern. For illustrative purposes, two different patterns are used to make the overlapping data tracks 17 more distinguishable. Moreover, in the drawings, the sectional view of the data tracks 17 is shown slightly offset along the writing direction 19 so that the overlapping structure is visible. Actual data tracks 17 continue in both directions along their respective tracks 3.

The numbering of #1 to #8 labeled on the data tracks 17 illustrates the order in which the overlapping data tracks 17 are to be written by the wide write element 15. By overlapping the data tracks 17, the effective track width 5 is halved in this case.

Figure 3:
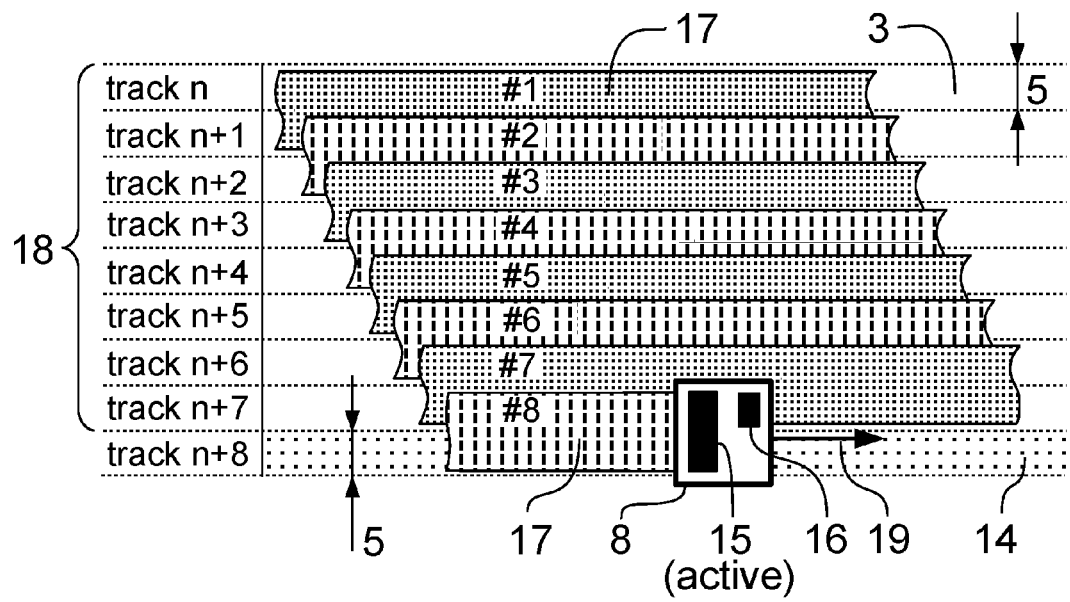
FIG. 3 is an illustration of a band with overlapping data tracks.

Individual bands 18 are separated by inter-band gaps, referred to herein as guard regions 14. FIG. 3 shows a guard region 14 on track n+8, marked with a dot pattern. In the illustrated configuration, the guard region 14 occupies a single track 3, referred to herein as a guard track 14. In other embodiments, depending on the width of the write element 15, the width of the guard region 14 may also be greater, for example, a multiple of the track width 5.

The guard track 14 is required to close off and delimit the band 18 so that the wide write element 15 does not overwrite any tracks 3 of a subsequent band 18. For instance, to write data on track n+7, as shown in FIG. 3, the wide write element 15 is positioned on both track n+7 and guard track n+8.

Those skilled in the art will recognize that, if data on the first track 3 of the band 18 (track number n) is to be altered or rewritten, the data on all subsequent tracks 3 up to the guard track 14 must first be read and buffered at a temporary location or in a memory or cache 11, and must finally be rewritten, as the contents of each subsequent track 3 will be destroyed during the writing process. This is referred to as read-modify-write or write amplification.

Figure 4:
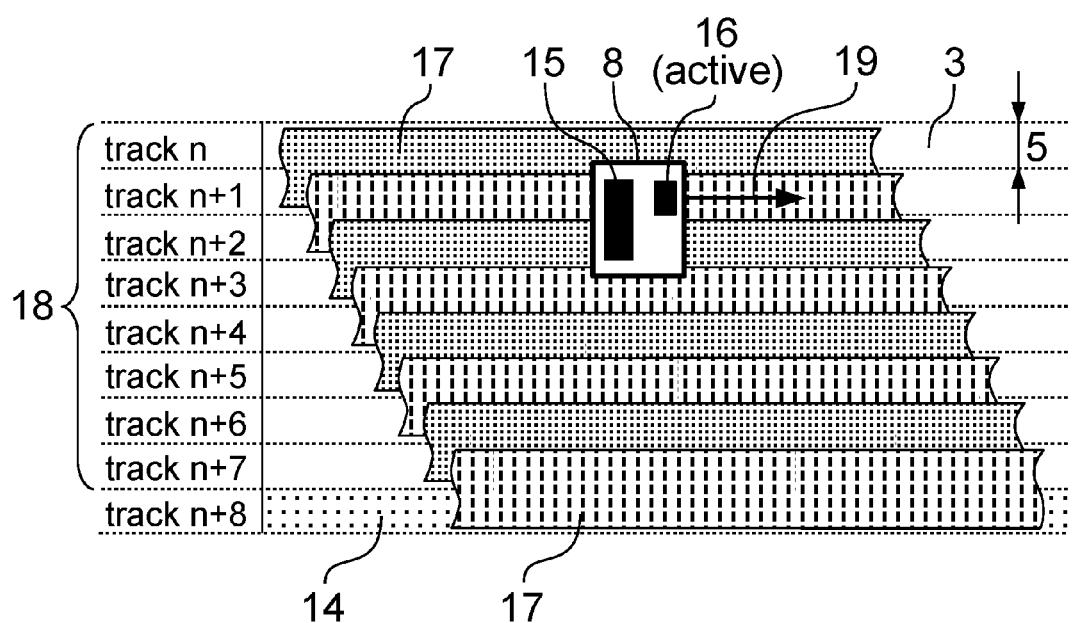
FIG. 4 illustrates how to read data from the overlapping data tracks.

FIG. 4 shows by way of example how track n+1 can be read from a full band 18. The read/write head 8 is positioned so that the active read element 16 is located on track n+1. The relative direction of motion of the read/write head 8 is indicated with an arrow 19. The read element 16 fits to the width of the tracks 3, i.e., the read element 16 is designed and optimized for the track width 5. This also applies to the effective width of the write element 15, which is designed to write data tracks 17 that are twice the track width 5.

The definition of track width 5 in shingled magnetic recording, as used in the present disclosure, is based on the width of the remaining readable data track 17 after overlapping with an adjacent data track 17. This remaining readable data track 17 constitutes the track 3 for which the read element 16 is designed or optimized.

Physical sectors 4 are sections of a track 3. The terms "sector" and "track" are therefore closely related technically and, depending on the desired embodiment, often equally applicable. Commonly, the umbrella term "track" is also representative of a portion of the track 3 under consideration. Whenever a track 3 is mentioned in the present disclosure, it can also refer to a physical sector 4 that is situated on it. Conversely, if the term "physical sector" is mentioned, the relevant operation may alternatively be applied to the entire track 3, or larger parts of the track 3.

The terms "track" (or "track number") and "cylinder" (or "cylinder number") are likewise closely related technically. Whenever a process is said to take place on a track 3, this may also concern the associated cylinder 12. Conversely, if the term "cylinder" is mentioned, this may imply involvement of at least one of the tracks 3 on the specified cylinder 12.

If a track 3 or band 18 is referred to as "preceding," "previous," "above," "upwards," or at an "upper" location, what is meant is that this track 3 or band 18 may be located farther outside on the disk surface 2 and/or may have a smaller track or cylinder number. If a track 3 or band 18 is "succeeding," "subsequent," "below," "downwards," or at a "lower" location, this track 3 or band 18 may be located farther inside on the disk surface 2 and/or may have a greater track or cylinder number. Depending on the embodiment, a reverse orientation (e.g., farther inside instead of farther outside) or a numbering of the tracks 3 and cylinders 12 in the opposite direction may also apply.

In the present disclosure, the term "guard region" is used as an umbrella term for "guard track" and "guard segment." A guard track is defined as a guard region consisting of one track 3. A guard segment is defined as a section of a guard region having a width of one or more tracks 3. As a general term, a guard region may consist of just one track 3 or more than one track 3.

In the present disclosure, the term "defective sector" is used as an umbrella term for a section of a track 3 which is poorly legible, unreliable, no longer legible, or defective. Also, the term "defective section" is used as a generalized term for "defective sector." Whenever a "defective sector" or a "defective section" is mentioned in the present disclosure, such defect may have any severity level. It is to be explicitly noted that the replacement of a defective section is possible regardless of said severity level. The same applies for the term "defective track."

FIG. 5 through FIG. 10 show bands 18 of a first embodiment. As in the previous examples, a read/write head 8 is used whose write element 15 writes data tracks 17 that are twice as wide as the track width 5. The bands 18 each comprise four tracks 3 in the initial state. However, any other desired number of tracks 3 per band 18 is possible. The number of four tracks 3 is chosen here as a means of better illustration.

The guard tracks 14 are located between the bands 18. In the illustrated examples, all bands 18 are fully occupied. Each track 3 is recorded with sector data, labeled with letters "A" to "L." In the upper half of the 2nd band on track n+6, as per FIG. 5, a poorly legible section 20 is shown ("defective"), whose sector data is marked with the letter "F." This defective section 20 may be a grown defect that may have been detected during the regular operation of the hard disk drive 1.

If sector data is poorly legible, it is usually remapped, i.e., stored at another location. A reserve area or spare sector area may be provided for this purpose, and remapping may be done by means of logical block addressing (LBA). The hard disk controller 10 may hide the physical position of the defective sector 20 by using a physical sector 4 from the spare sector area instead. Also, the hard disk controller 10 may hide a defective track by using a spare track. This process is state of the art and is known as G-list remapping.

In the first embodiment and in further embodiments, small remaining spare sector areas are optional. Instead, according to one aspect of the invention, defective sections 20 are repurposed to guard regions 14. The portion of the disk surface 2 that is necessary for the guard regions 14 thus simultaneously functions as a spare sector area for defective sectors 20.

In order for a defective track 3 (with at least one defective sector 20) to be able to act as a guard region 14, the current guard region 14 may be displaced to the position of the defective track 3, and the boundaries of the corresponding bands 18 may be shifted to the level of this repositioned guard region 14. This may result in two bands 18 with a variable, i.e., different number of tracks 3, which are separated by the defective track 3 now acting as guard region 14.

Figure 5:
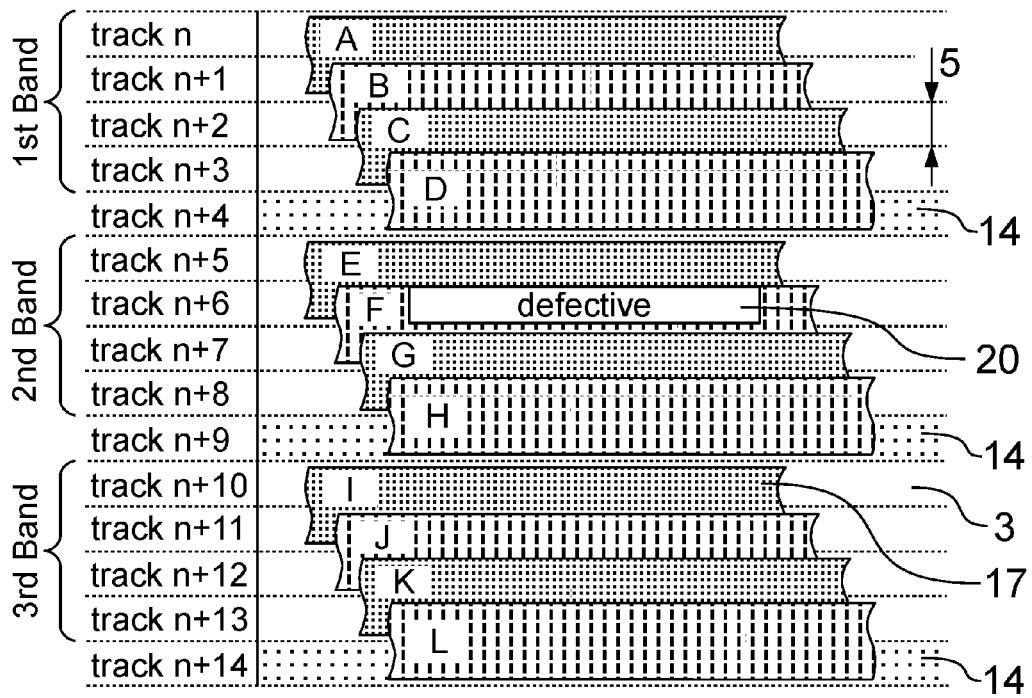
FIG. 5 shows three bands with a defective sector on track n+6 in the 2nd band.
Figure 6:
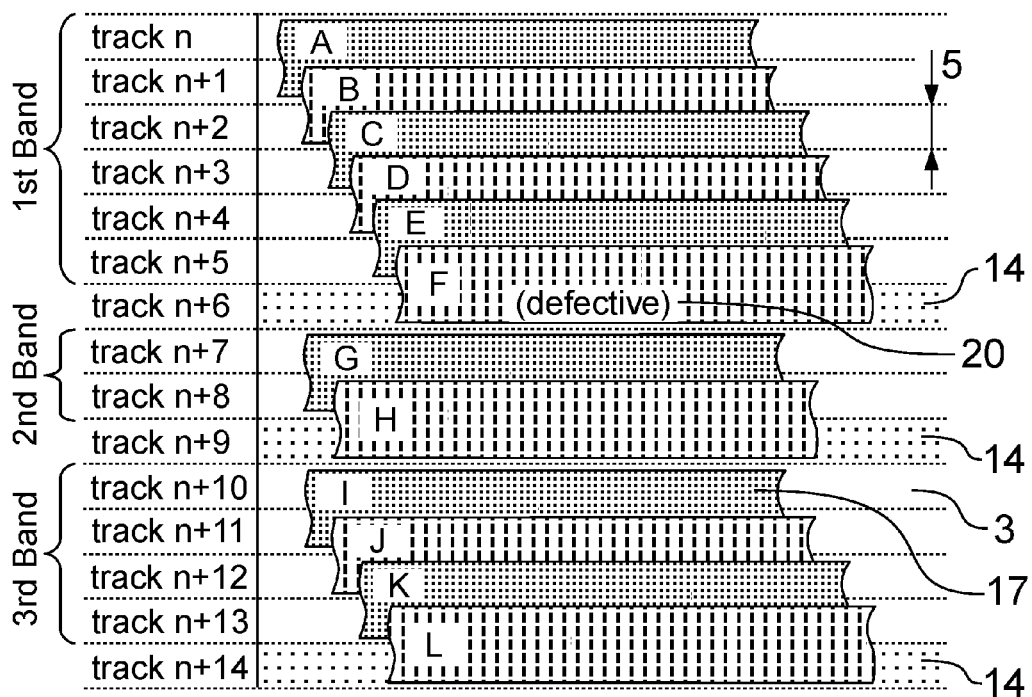
FIG. 6 shows the replacement of the defective sector by shifting the upper guard region.

Based on the initial state shown in FIG. 5, the 2nd band in FIG. 6 is "repaired" by repositioning a guard track 14 from track n+4 to track n+6, which is the track 3 with the defective sector 20. The 1st band thus increases from four tracks to six tracks (track n to track n+5) and the 2nd band is reduced from four tracks to two tracks (track n+7 and track n+8).

All sector data from the fully occupied bands 18 is still accommodated even after the reconfiguration. In order to modify the track count of the 1st and 2nd bands, as per example in FIG. 5 and FIG. 6, the data of two tracks 3 is rewritten. In particular, the entire sector data "E" on track n+5 is first read out and then, due to the twice-as-wide write element 15, written onto the tracks n+4 and n+5. Subsequently, the entire retrievable sector data "F" on track n+6 (if possible, including the poorly legible section 20) is read out and, due to the twice-as-wide write element 15, written onto the tracks n+5 and n+6. The defective track n+6 now acts as a new guard track 14. Alternatively, instead of performing the read and write operations track by track, it is also possible to read out both tracks, n+5 and n+6, in a first step and to write the cached sector data of both tracks to their respective target tracks 3 in a second step. This variant is demonstrated in the flowchart as per FIG. 13 and is described further below. In both cases, the sequential order of the sector data "A" to "L" remains, as shown in FIG. 6, even after the reconfiguration.

Those skilled in the art will recognize that the sector data of bands 18 needs not be rewritten as part of the reconfiguration of band boundaries if the physical sectors 4 in the affected bands 18 are empty or in case the contents of these physical sectors 4 has been released by the file system. In some cases the bands 18 need not to be completely empty, and rewriting sector data is still not necessary for the reconfiguration. For example, as per FIG. 5 and FIG. 6, if sector data "E" and "F" have been released by the file system, rewriting these sector data onto the tracks n+4 and n+5 is not necessary. These aspects also apply to further embodiments described below.

Depending on whether a defective sector 20 is located in the upper or lower half of the affected band 18, the upper or the lower boundary of the band 18 may be moved in order to reconfigure the bands 18. In the previous example, as per FIG. 5 and FIG. 6, the defective sector 20 is located in the upper half of the band 18.

Figure 7:
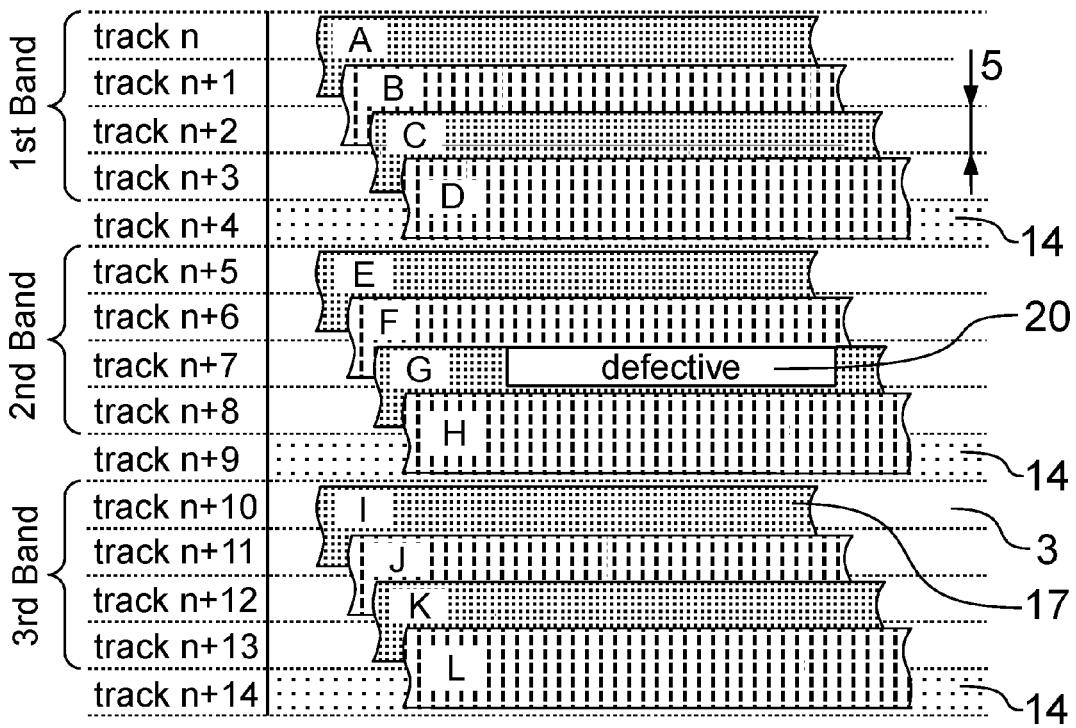
FIG. 7 shows three bands with a defective sector on track n+7 in the 2nd band.

FIG. 7 shows an example, wherein the defective sector 20 is located in the lower half of the band 18, namely on track n+7 of the 2nd band. As a means of "repair," the lower band boundary may be shifted.

Shifting the lower band boundary may be done by reading out all sector data that is affected by the shift, buffering this data at a temporary location or in the memory 11, and rewriting the data, displaced by one track 3. In particular, as per example in FIG. 7 and FIG. 8, the sector data on all tracks 3 between track n+7 and track n+13 (both inclusive) is read and buffered in the memory 11. Subsequently, the sector data of track n+7 and track n+8 is rewritten, displaced by one track 3 downwards, onto the tracks n+8 and n+9, i.e., sector data "G" is shifted from track n+7 to track n+8, and sector data "H" is shifted from track n+8 to track n+9. (In this embodiment, the data is displaced by one track 3, since the guard region 14 is one track 3 wide.) Finally, due to the overlapping structure of the data tracks 17, the sector data originating from the tracks 3 of the 3rd band also has to be rewritten (track n+10 to track n+13), until the guard track 14 on track n+14 is reached. Sector data "I," "J," "K," and "L" are therefore rewritten but do not shift position. As before, this process ensures that the sequential order of the sector data ("A" to "L") is preserved after the reconfiguration.

Figure 9:
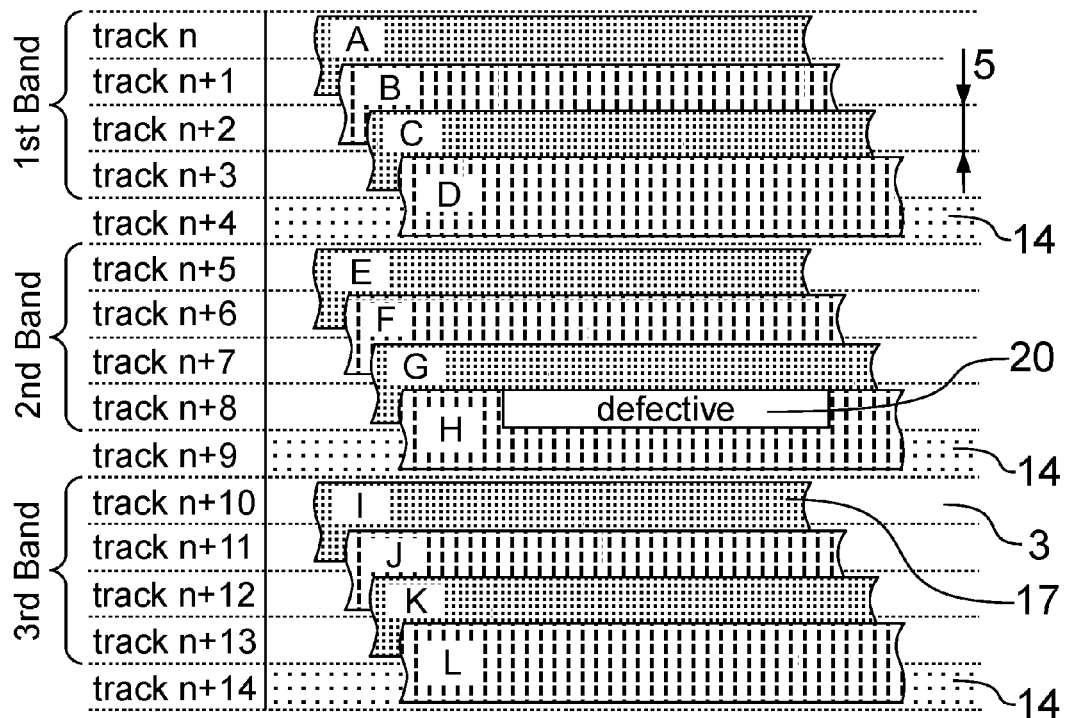
FIG. 9 shows three bands with a defective sector on track n+8 in the 2nd band.

In the best case, no read-modify-write operations are required for the reconfiguration of bands 18, even if the bands 18 are fully occupied. This is illustrated by the next example: FIG. 9 shows defective sector data "H" on track n+8, and in accordance with FIG. 10, as a means of "repair," the guard track 14 on track n+9 is moved to track n+8. The lower boundary of the 2nd band is shifted by one track upwards so that the 2nd band consists of three tracks 3 and the 3rd band consists of five tracks 3. The official location of sector data "H" is displaced from track n+8 to track n+9. Due to the wide write element 15, sector data "H" has already been written onto the former guard track 14 on track n+9 and hence, in this case, read and write operations are not necessary for reconfiguration.

Figure 8:
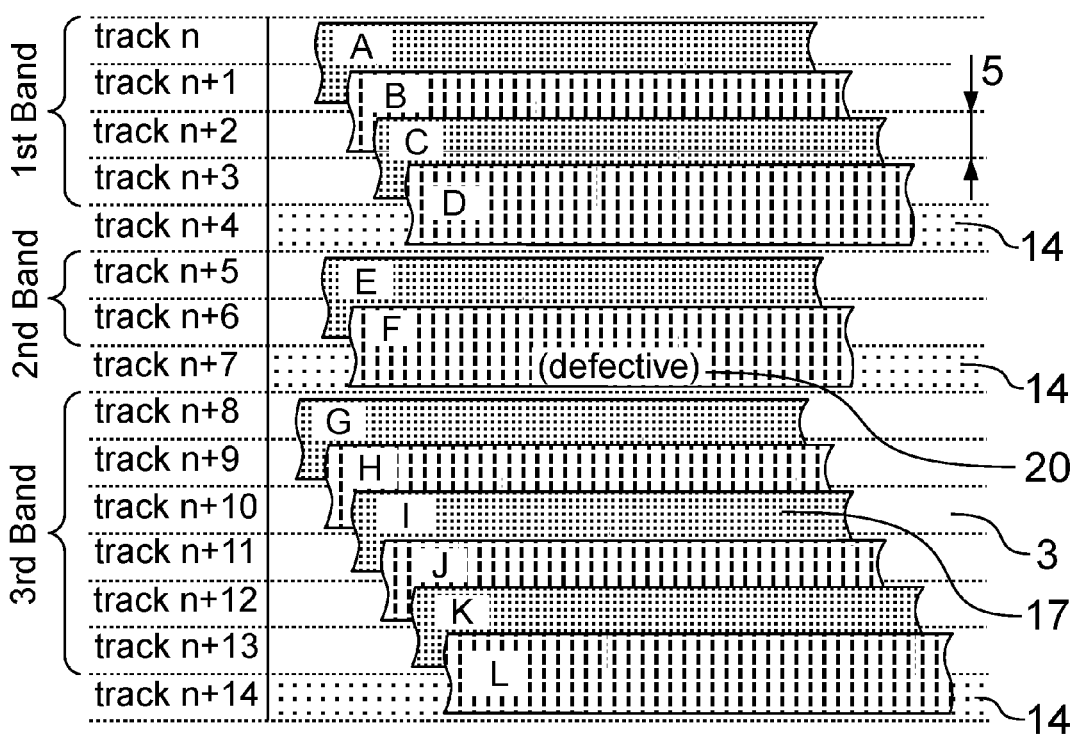
FIG. 8 shows the replacement of the defective sector by shifting the lower guard region.
Figure 10:
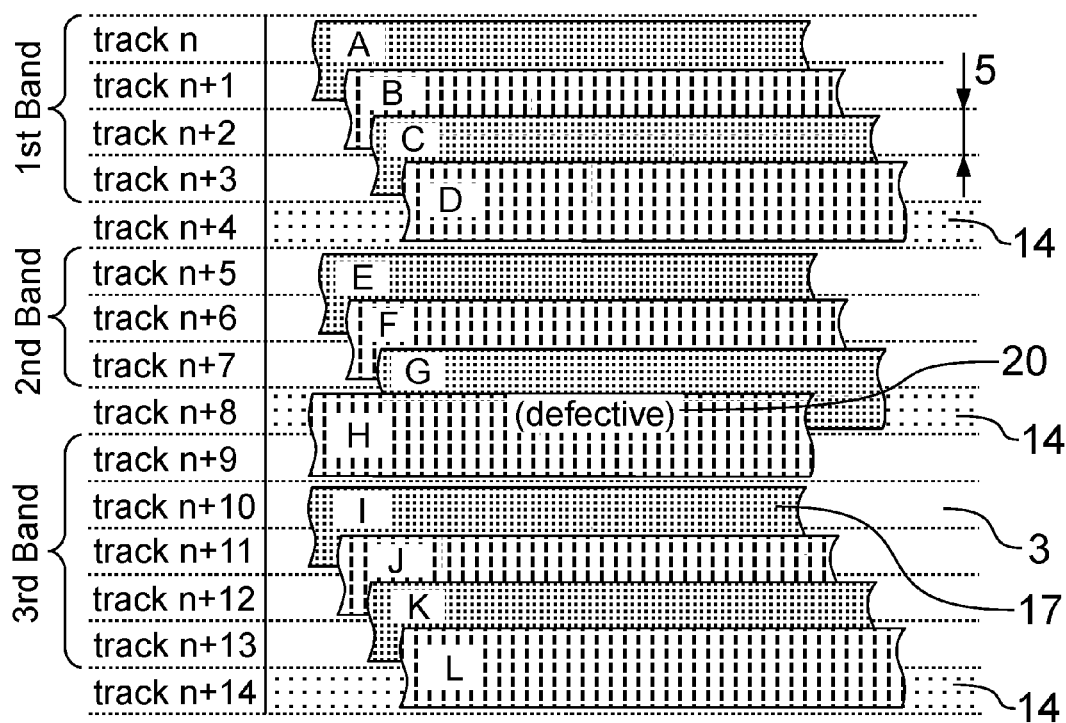
FIG. 10 shows that in some cases the replacement of the defective sector can be done without read-modify-write.

The reconfigured arrangement of the bands 18, as illustrated in FIG. 6, FIG. 8, and FIG. 10, may have no adverse effect on performance during read operations. This may distinguish the first embodiment (and further embodiments) from conventional solutions, which typically use a separate spare sector area. In particular, in the first embodiment (and in further embodiments) the sector data remains in the same order on the tracks 3 even after a reconfiguration of the bands. The read element 16 can continuously read large files or data from track to track without the need to span greater distances when seeking another track 3. Therefore, even if disk surfaces 2 are affected by newly recognized grown defects, i.e., defective sectors 20, the first embodiment (and further embodiments) may have regular seek times corresponding to an error-free SMR hard disk drive 1 without any grown defects.

Conventional hard disk drives may store a reference to a spare sector in a G-list (grown defects list). This spare sector, located in a spare sector area, may replace the defective sector 20, a process also referred to as remapping. In the first embodiment (and further embodiments), this approach is optional. Instead or additionally, information about the reconfiguration of the bands 18 may be stored in a new type or extended version of G-list, referred to herein as an "extended G-list." To this end, it suffices to store the track numbers of the guard tracks 14 (located between the bands 18) in the extended G-list. The beginning of each band 18 may be determined by increasing the track number of the previous guard track 14 by one. The end of each band 18 may be determined by decreasing the track number of the subsequent guard track 14 by one.

FIG. 11 illustrates the process of updating the entries in an extended G-list to reconfigure the bands 18; a part of an extended G-list is shown that is based on the example of FIG. 5. In the initial state, the 1st, 2nd, and 3rd bands are assigned to the track numbers n+4, n+9, and n+14, each track number representing a guard track 14. After the reconfiguration as per FIG. 6, the entry of the 1st band changes from track n+4 to track n+6.

FIG. 12 illustrates the process of reconfiguration based on the example shown in FIG. 9 and FIG. 10. Here, the entry of the 2nd band changes from track n+9 to track n+8.

In order to preserve the sequential order of sector data after a reconfiguration (e.g., sector data "A" to "L" in FIG. 5 through FIG. 10), references to the new physical positions of shifted sector data (now located on alternate tracks 3) may be stored in the extended G-list. Typically this is done by means of logical block addressing (LBA).

A host system 9, which accesses the SMR hard disk drive 1, may use logical block addresses (LBAs) in commands to read and write sector data without regard for the actual locations of the physical sectors 4 on the disc surfaces 2. E.g., by means of the hard disk controller 10, LBAs may be mapped to physical block addresses (PBAs) representing the physical sectors 4. Different mapping techniques for such an indirect read and write access are known in the prior art.

In some embodiments, LBA-to-PBA mapping does not change often. With regard to the extended G-list remapping, as described above, the LBA-to-PBA association may only change in the case of a reconfiguration of band boundaries, that is, as soon as at least one guard region 14 shifts position. For example, as per FIG. 5, if the host system 9 requests sector data "E," the corresponding logical block addresses point to physical sectors 4 on track n+5 by means of logical block addressing. After the reconfiguration, as per FIG. 6, said logical block addresses, in accordance to entries in the extended G-list, now point to physical sectors 4 on track n+4, which, in this case, has previously been used as a guard track 14.

In other embodiments, LBA-to-PBA mapping may change with every write operation as the physical sectors 4 are assigned dynamically. Such embodiments may store the LBA-to-PBA association and the configuration of the bands 18 in a map or another type of data structure.

For instance, U.S. Pat. No. 8,756,399 B2, entitled "Mutable association of a set of logical block addresses to a band of physical storage blocks," describes such a dynamic association, the disclosure of which is hereby incorporated by reference in its entirety. U.S. Pat. No. 8,756,399 B2 suggests a map format which, among other things, stores "LBA sets mapped to bands" and "LBAs allocated to existing sectors." Those skilled in the art will recognize that such a map format or a comparable approach could be extended or modified to store positions of displaced guard regions 14. Also, those skilled in the art will recognize that, as soon as a band 18 must be reconfigured due to a recognized grown defect (defective sector 20), the necessary remapping of logical block addresses (LBAs) to physical sector 4 may be achieve by updating said map.

It is to be explicitly noted that embodiments of the present invention can be implemented using any type of remapping technique, including, but not limited to, dynamic or mutable association of logical block addresses to physical sectors 4. Also, those skilled in the art will understand that the method by which information about displaced guard regions 14, band boundaries, and sector data is stored and maintained depends on the remapping technique used for a specific embodiment, and that this information must not necessarily be stored in an extended G-list.

FIG. 13 shows the flowchart to the first embodiment. Variable "d" defines the track number of a track 3 with a defective sector 20, typically a grown defect. Track number "a" defines the location of the upper guard track 14, which is adjacent to the upper boundary of the affected band 18, and track number "b" defines the location of the lower guard track 14, which is adjacent to the lower boundary of the band 18.

First, in step 21, it is determined whether the defective sector 20 is located in the upper or in the lower half of the affected band 18.

$$d \le \frac{a+b}{2}$$

If the inequality proves true, the defective sector 20 is allotted to the upper half of the band 18 and, in step 22, all sector data that essentially is located between the upper guard track 14 and the track 3 with the defective sector 20 is read and cached in memory 11 (i.e., all tracks 3 below track number "a" through and including track number "d").

In step 23, the upper guard track "a" is displaced to track number "d".

$$a=d$$

This is done by changing the corresponding entry in the extended G-list, thereby shifting the boundary between the adjacent bands 18 as described with respect to FIG. 11 and FIG. 12.

Finally, in step 24, the cached sector data is written back onto the tracks 3, displaced upwards by one track.

$$c_{new}=c_{old}-1$$

where "c" are track numbers of physical sectors 4 indicating the original location ("old") and the target position ("new") of sector data.

Returning to step 21, if the defective sector 20 is located in the lower half of the affected band 18, in step 25, all sector data, starting with track number "d" up until the end of the succeeding band 18, is read and cached in memory 11.

Reconfiguration of the bands 18 takes place in step 26. First, the former track number of the lower guard track "b" is stored temporarily as variable "$b_{old}$."

$$b_{old}=b$$

Next, the lower guard track "b" is moved to track number "d" by changing the corresponding entry in the extended G-list.

$$b=d$$

Finally, in step 27, the cached sector data is written back onto the tracks 3, displaced downwards by one track, up to (and including) the former track number of the lower guard band "$b_{old}$."

$$c_{new}=c_{old}+1$$

where "c" are track numbers of physical sectors 4 indicating the original location ("old") and the target position ("new") of sector data.

The remaining cached sector data from the tracks 3 below track number "$b_{old}$" is rewritten on the respective original tracks, i.e., back to the original location, until the next guard track 14 is reached. This is done, because the write element 15 writes overlapping data tracks 17.

FIG. 14 through FIG. 20 show bands 18 of a second embodiment, which demonstrate how defective sectors 20 on more than one track 3, all located in the same band 18, may be "repaired." Again, a read/write head 8 is used, whose write element 15 is twice as wide as the read element 16.

Figure 14:
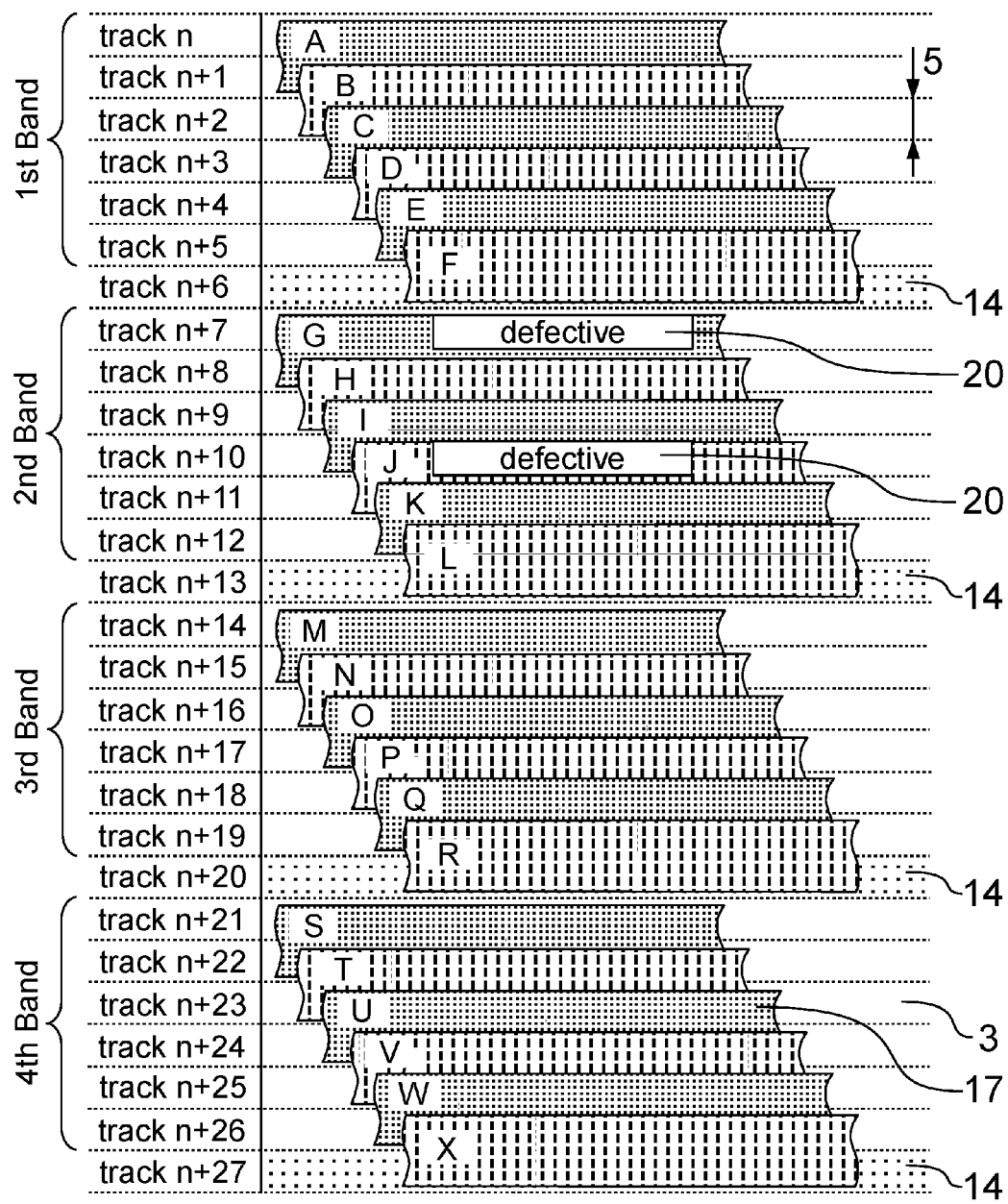
FIG. 14 shows four bands with defective sectors on two tracks in the 2nd band.

The bands 18 depicted in FIG. 14, by way of example, each consist of six tracks 3, representing the width of the bands 18 in the initial state. At least one defective sector 20 is located on both, track n+7 and track n+10. Thus, the defective sectors 20 are located on two different tracks 3 in the same band 18. The defect can nevertheless be "repaired" by shifting both the upper boundary as well as the lower boundary of the 2nd band.

Figure 15:
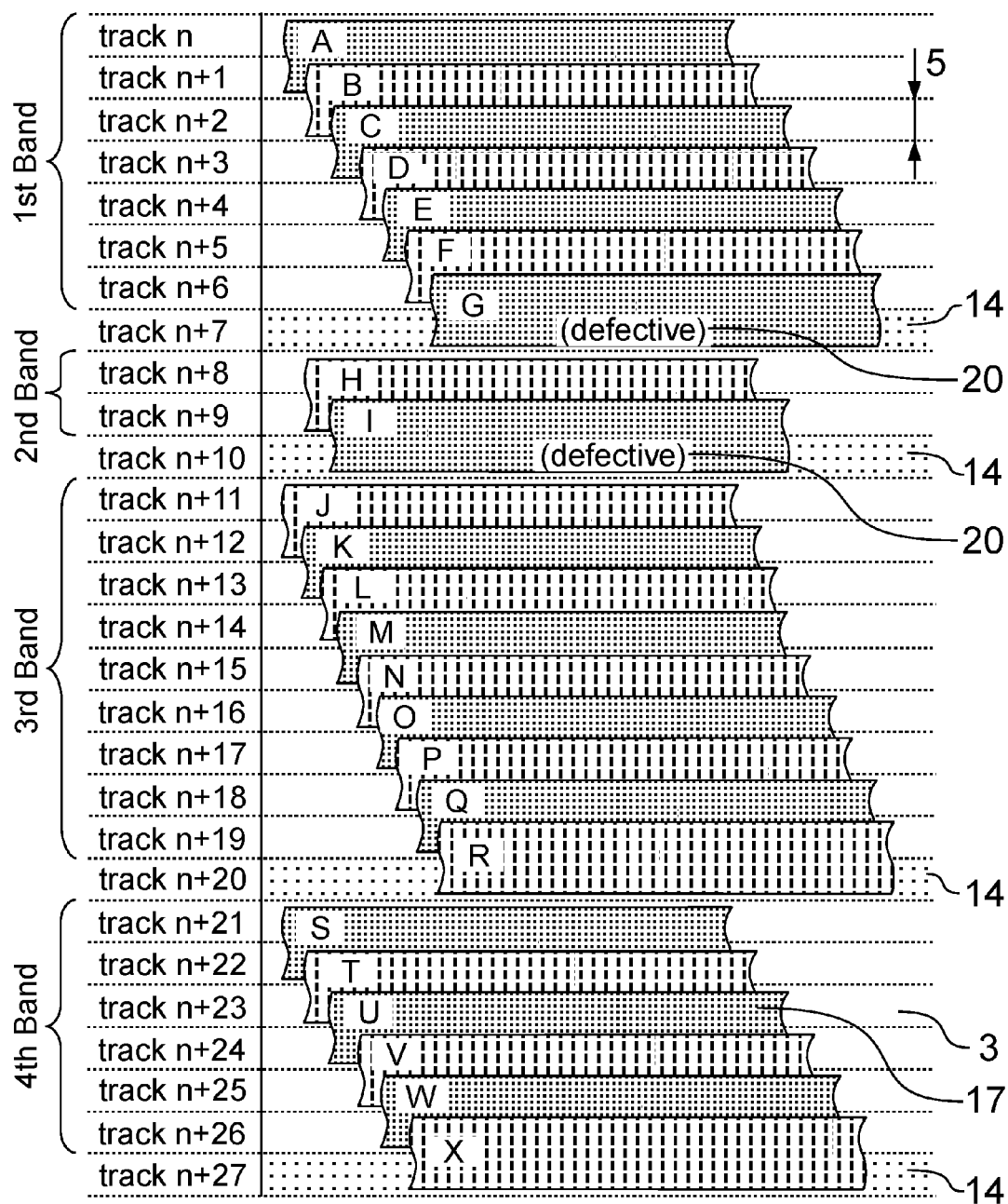
FIG. 15 shows the replacement of two defective tracks in one band.

The "repaired" bands 18, after the reconfiguration, are illustrated in FIG. 15. The guard track 14 above the 2nd band has been displaced from track n+6 to track n+7, thus onto a track 3 with a defective sector 20. Likewise, the guard track 14 below the 2nd band has been displaced from track n+13 to track n+10. Accordingly, the width of the 2nd band is reduced to two tracks 3. The width of the 1st band increases to seven tracks 3 and the width of the 3rd band increases to nine tracks 3. Following the approach in the first embodiment, the new position of each guard track 14 (and thus, indirectly, also the position and width of the bands 18) may be stored in an extended G-list. The two former guard tracks 14 on track n+6 and track n+13 are repurposed to store data, so that all sector data is accommodated despite the fully occupied bands 18.

To preserve the sequential order of the sector data, all sector data from the tracks 3 affected by the reconfiguration may be read out, buffered in memory 11, and may then be rewritten, displaced by the width of the guard region 14. This corresponds to the approach in the first embodiment, whereas, in this case, the update is done for both, the upper and lower boundaries of the affected band 18. In the particular, non-limiting example shown in FIG. 14 and FIG. 15 the following steps may be performed:

For the upper boundary of the 2nd band, the retrievable sector data "G" on track n+7 is read (if possible including the poorly legible section 20), buffered, and rewritten onto the tracks n+6 and n+7 by means of the wide write element 15, whereby the defective track n+7 serves as a new guard track 14.

For the lower boundary of the 2nd band, the sector data of all tracks 3 from (and including) track n+10 to (and including) track n+19 is read and buffered in the memory 11. Subsequently, the sector data originating from the tracks n+10 through n+12 is rewritten onto the tracks n+11 through n+13, displaced downwards by one track. Sector data "J," shown in FIG. 14 and FIG. 15, is thus displaced from track n+10 to track n+11. Sector data "A" is displaced from track n+11 to track n+12, and sector data "L" from track n+12 to track n+13. Finally, due to the overlapping structure of the data tracks 17, the remaining sector data from the tracks 3 of the 3rd band (track n+14 through track n+19) is rewritten to its original location until the guard track 14 on track n+20 is reached. Sector data "M," "N," "O," "P," "Q," and "R" are thus rewritten, but do not shift position. The sequential order ("A" to "X") is preserved after the reconfiguration.

Figure 16:
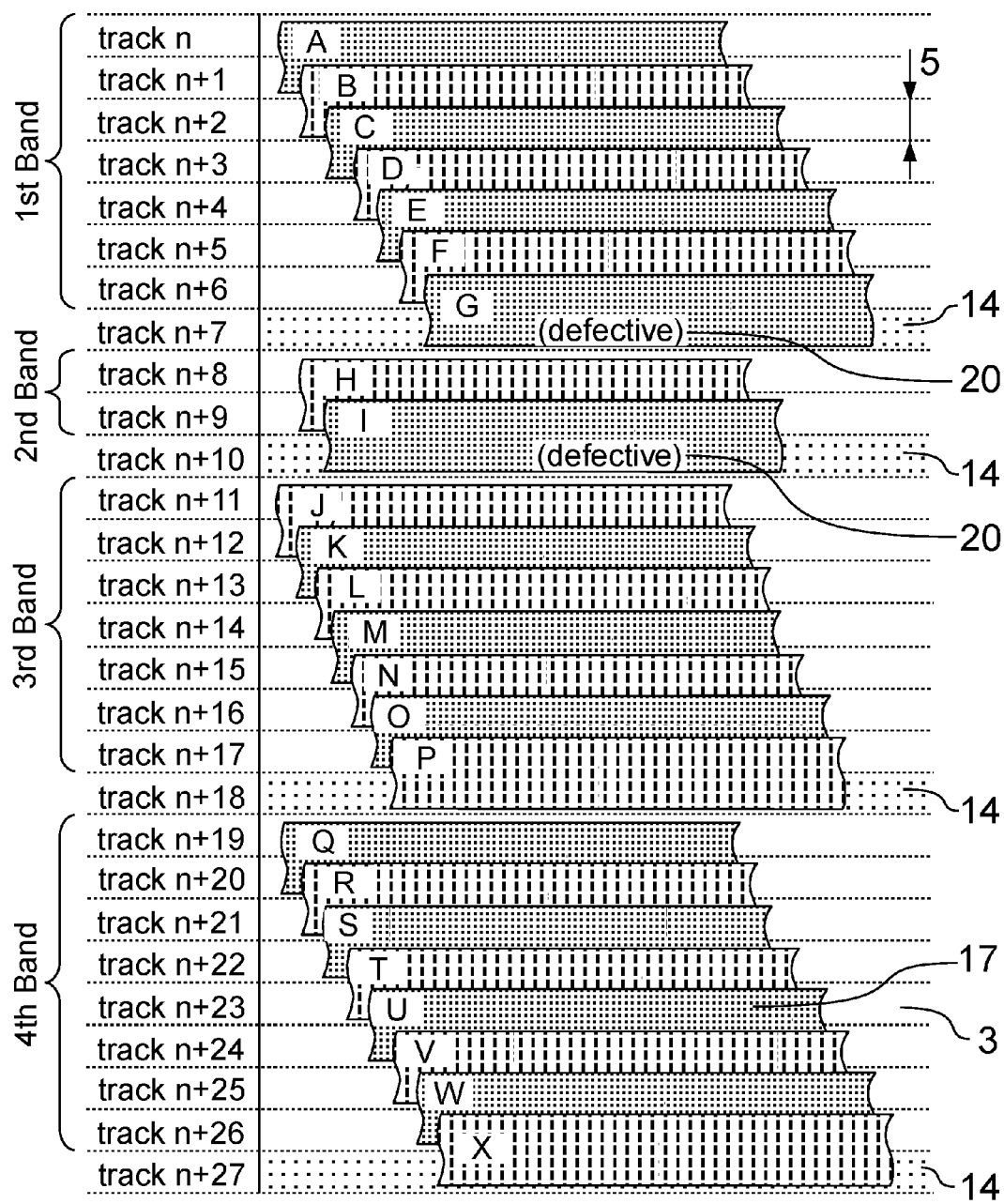
FIG. 16 illustrates how to equalize the number of tracks in adjacent bands.

After the reconfiguration, the 3rd band consists of nine tracks 3 and is noticeably wider, as shown in FIG. 15. Therefore, optionally, a redistribution of the tracks 3 to adjacent bands 18 may be carried out, to avoid the write amplification being excessively large when updating the sector data in the 3rd band, e.g., due to a random write access. This is illustrated in FIG. 16: The guard track 14 between the 3rd band and the 4th band has been displaced upwards from track n+20 to track n+18 by two tracks. The reconfiguration is carried out by reading, buffering, and rewriting sector data in the same manner as described with respect to the lower boundary of the 2nd band in FIG. 15.

As a result of the reconfiguration, the 3rd band consists of seven tracks 3, as depicted in FIG. 16, and since the 3rd band now has only one additional track 3 compared to the initial state, the additional write amplification (e.g., in the case of a random write access) may be insignificant. The 4th band now comprises eight tracks 3, that is, two additional tracks 3 compared to the initial state. In order to achieve an optimal distribution of the additional tracks 3 here as well, the guard track 14 at the lower boundary of the 4th band may optionally be displaced from track n+27 to track n+26, causing the 4th band to be one track narrower while a 5th band gets one track wider. (Not shown in the drawings.) This additional, yet optional, optimization results in the 1st, 3rd, 4th and 5th bands having adopted an additional track 3, thereby compensating for the 2nd band, whose width has been reduced to two tracks 3 due to the defective sectors 20.

Figure 17:
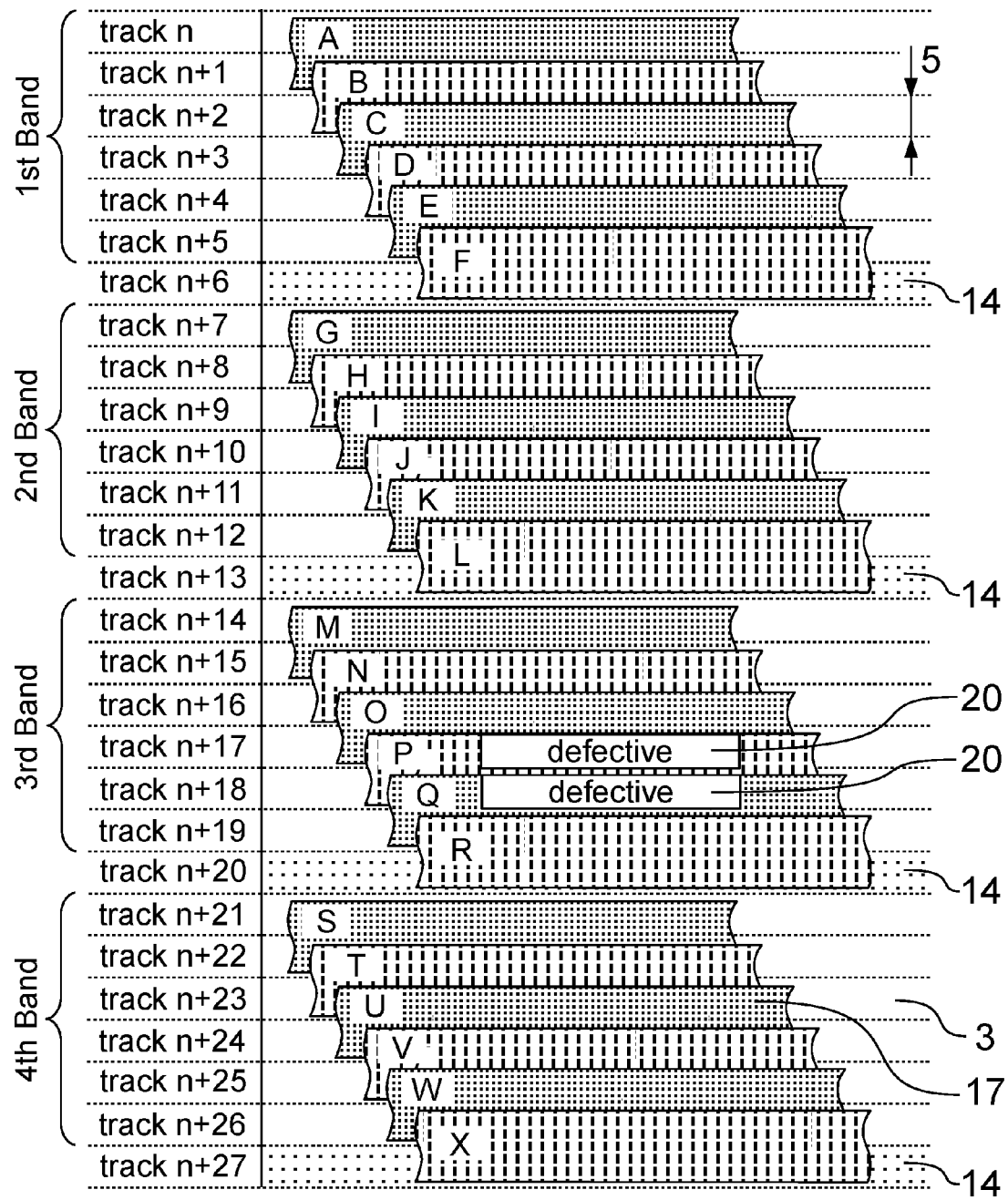
FIG. 17 shows four bands with defective sectors on two adjacent tracks in the 3rd band.
Figure 18:
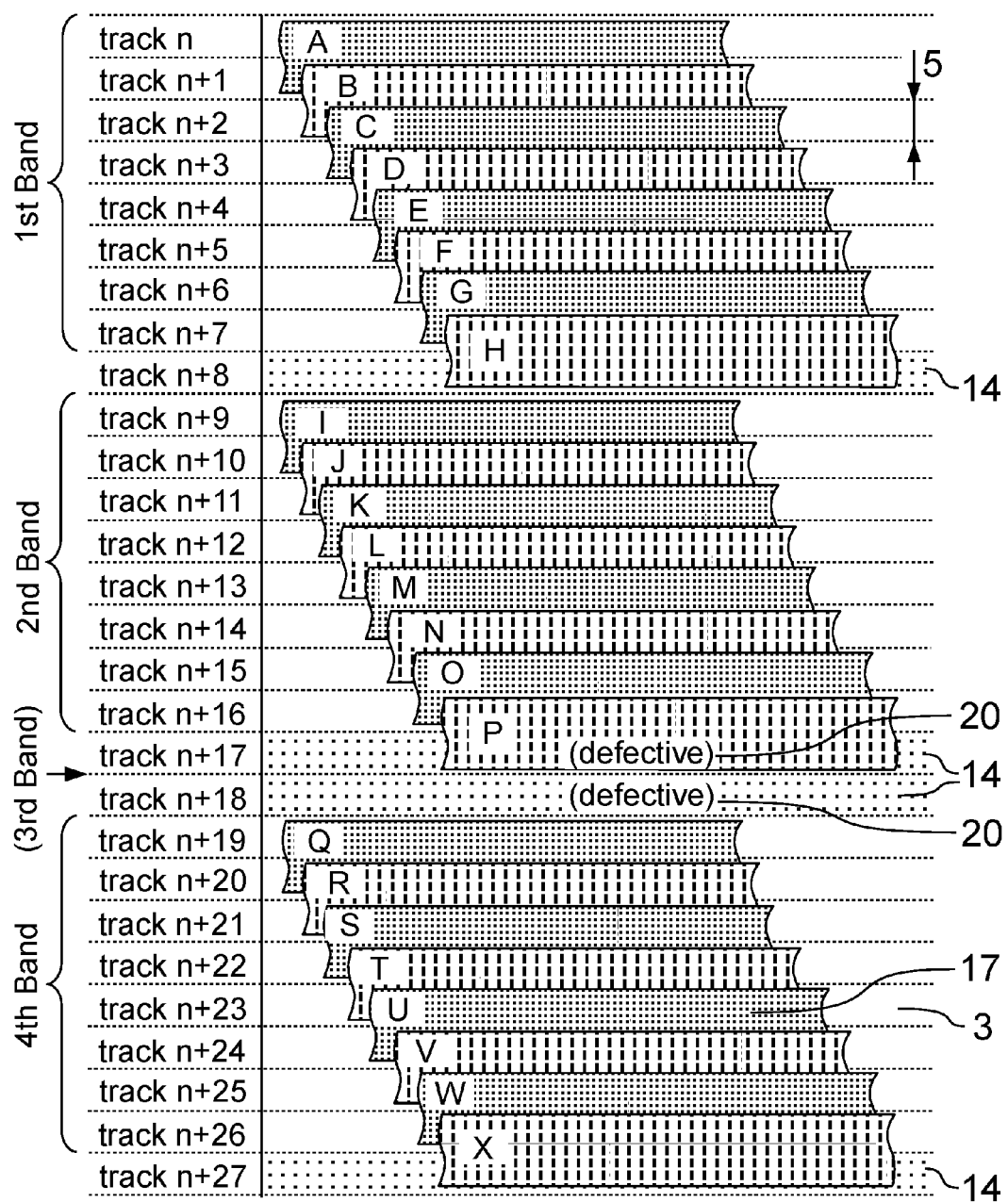
FIG. 18 shows the replacement of defective sectors on adjacent tracks.

FIG. 17 shows a situation where defective sectors 20 are located on two directly adjacent tracks 3, namely the tracks n+17 and n+18, which are both located in the 3rd band. "Repair" is nonetheless possible, as illustrated in FIG. 18. The guard track 14 between the 2nd and 3rd bands is shifted from track n+13 to track n+17, and the guard track 14 between the 3rd and 4th band is shifted from track n+20 to track n+18, e.g., by changing the corresponding entries in an extended G-list. The 3rd band is, in effect, completely canceled: Since the shifted guard tracks 14 now are located next to each other, the 3rd band contains zero tracks. In the present embodiment, the original numbering of the bands 18 is nevertheless maintained. In other embodiments, the bands 18 may be renumbered, so that, by way of example, the 4th band is assigned the number of the 3rd band.

Furthermore, the example in FIG. 18 reveals, how the former sector data of the canceled 3rd band is distributed evenly onto the 1st, 2nd, and 4th bands, so that each of these bands 18 incorporates two additional tracks 3, resulting in eight tracks 3 per band 18. This is done by shifting the guard track 14 between the 1st and 2nd band from track n+6 to track n+8. The approach corresponds to the description in regard to FIG. 16.

The rearrangement of the sector data from the initial state shown in FIG. 17 to the new configuration shown in FIG. 18 can be comprehended by means of the letters "A" to "X," which are labeled on the data tracks 17 for this purpose. Reconfiguration may be done by reading, buffering, and rewriting sector data and may be carried out in the manner described above.

Additional defective sectors 20 on further tracks 3 in the same band 18, (e.g., the 3rd band in FIG. 17) may be compensated by involving adjacent bands 18, that is, involving an additional band 18 per defective track 3. For instance, with reference to FIG. 18, if a further defective sector 20 were located on track n+16, the lost space could be compensated by repurposing the guard track 14 on track n+8 for storing data. (Not shown in the drawings.)

Figure 19:
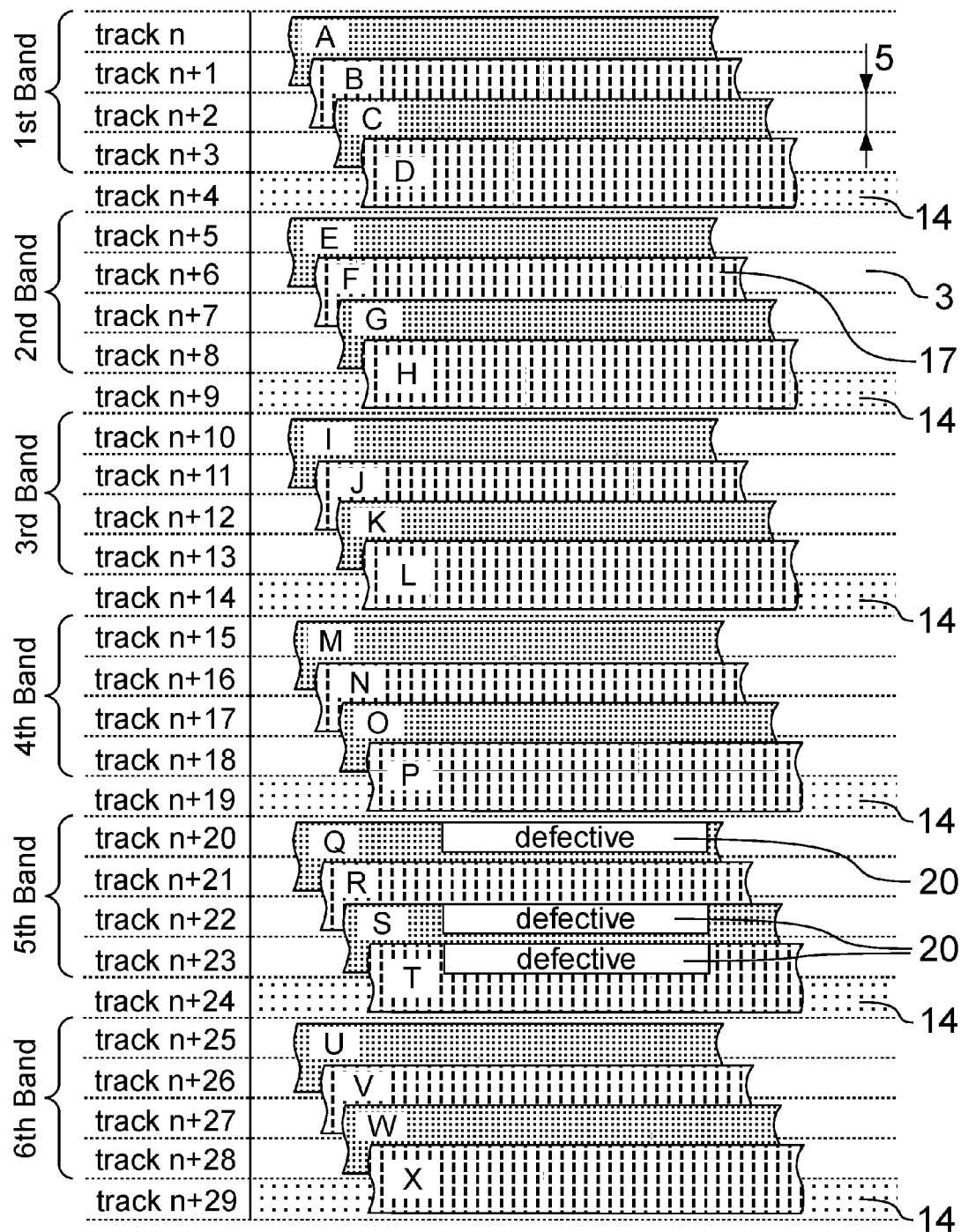
FIG. 19 shows six bands with defective sectors on three tracks in the 5th band.
Figure 20:
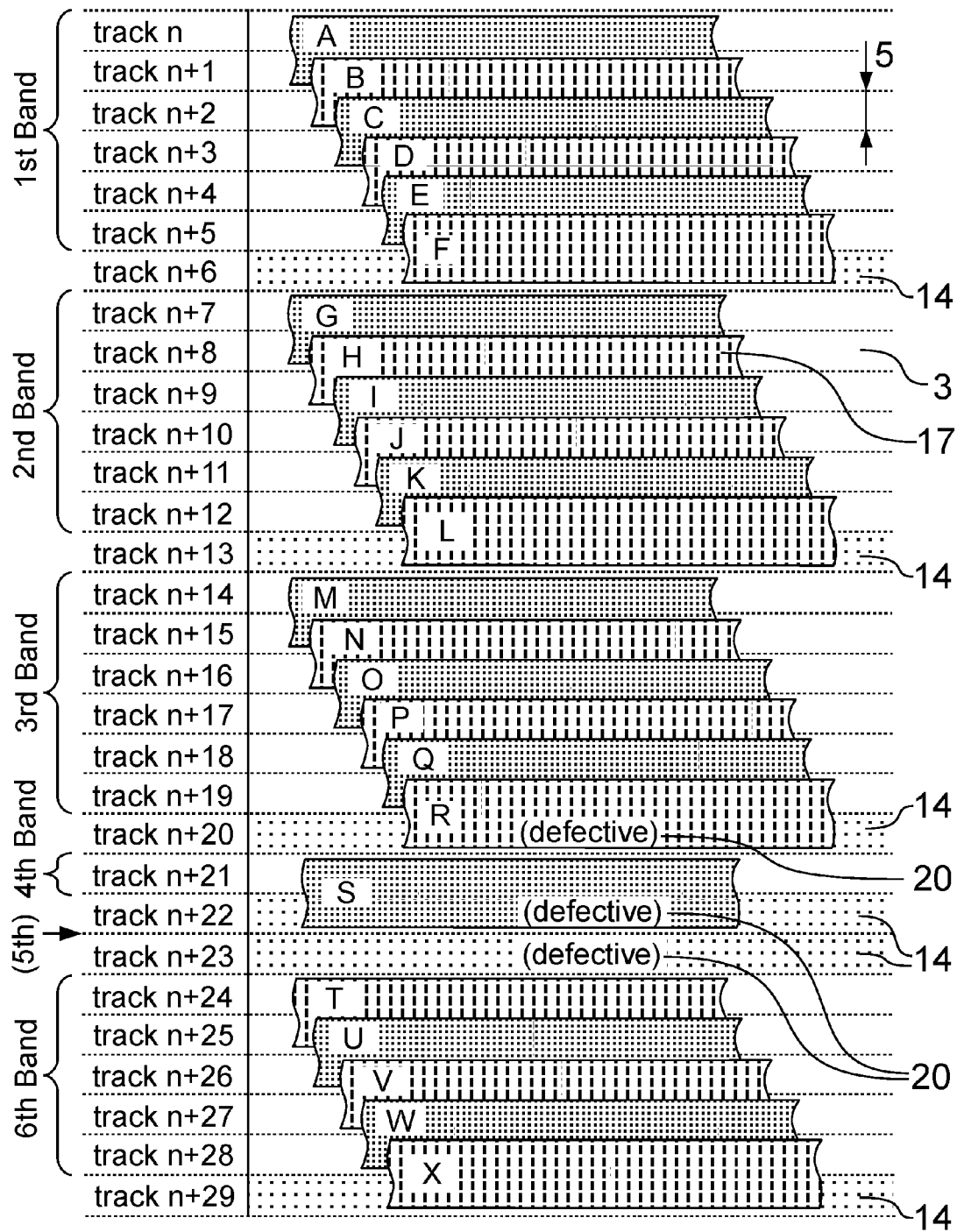
FIG. 20 shows the replacement of three defective tracks in one band.

FIG. 19 and FIG. 20 demonstrate a case in which, by way of example, three tracks 3 in one band 18 contain defective sectors 20. For illustrative reasons, the bands 18 in this example each comprise four tracks 3 in the initial state, as per FIG. 19. The three defective tracks 3 are located in the 5th band on the tracks n+20, n+22, and n+23, making the 5th band largely unusable. Referring to FIG. 20, "repair" is made by displacing the guard tracks 14 from the tracks n+14, n+19, and n+24 to the tracks n+20, n+22, and n+23, that is, by displacing the guard tracks 14 to the tracks 3 containing defective sectors 20.

Optionally, to prevent the 3rd band from becoming undesirably wide, the guard track 14 on track n+9 may be displaced to track n+13, and the guard track 14 on track n+4 may be displaced to track n+6, as shown in FIG. 20. The resulting bands 18 thus maintain a balanced number of tracks 3. The 1st, 2nd, and 3rd band each adopts two additional tracks 3. Due to the defects, the 4th band merely includes one single track 3 and the 5th band formally has zero tracks and may be canceled. The 6th band now consists of five tracks 3.

In some embodiments, such as the first and second embodiment, the sequential order of all sector data is preserved by repositioning the sector data on all tracks 3 affected by the reconfiguration of band boundaries, i.e., the displacement of a guard region 14. This may be done to optimize sequential read and write speeds. However, alternatively, when shifting a guard track 14, it is sufficient to reposition the sector data of a single track 3. Basically, the guard track 14 swaps position with the sector data of the defective track 3. All other sector data remains in its old position. The sequential order of sector data on adjacent tracks 3 is not necessarily preserved. This approach may minimize the amount of data that must be read, buffered, and rewritten to reconfigure the bands 18.

Figure 21:
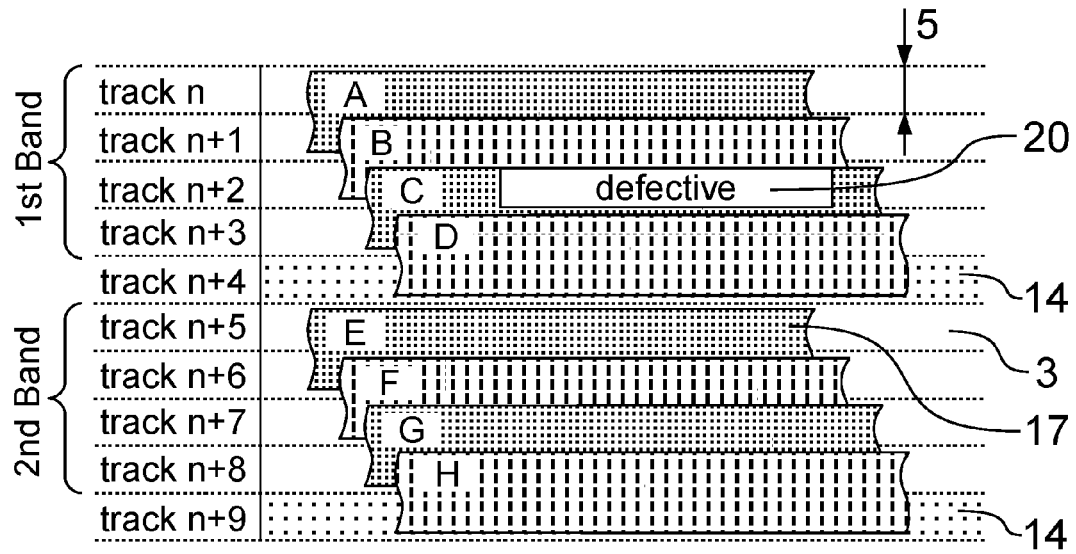
FIG. 21 shows two bands with a defective sector on track n+2 in the 1st band.
Figure 22:
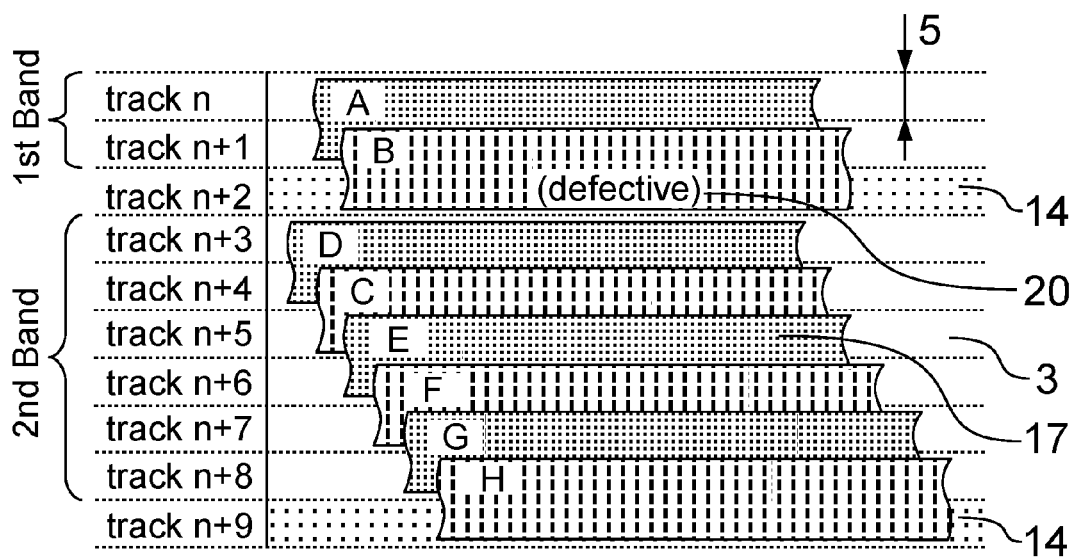
FIG. 22 shows a direct replacement without preserving the sequential order.

FIG. 21 and FIG. 22 provide an example: A defective sector 20 is located on track n+2, as illustrated in FIG. 21, and as a means of "repair," the guard track 14 on track n+4 is moved to track n+2, as illustrated in FIG. 22. In turn, sector data "C" originating from the defective track 3 attains the former position of the displaced guard track 14, and is thus moved from track n+2 to track n+4 by means of a read and write operation.

After the reconfiguration as per FIG. 22, the resulting bands 18 have a width of two tracks 3 (1st band) and six tracks 3 (2nd band). During the reconfiguration, sector data "D" is not shifted (such as in the first and second embodiments), and therefore the resulting order of sector data is non-sequential, i.e. "A," "B," "D," "C," "E," (etc.).

Those skilled in the art will recognize that, depending on the objective, an appropriate variant should be selected that is advantageous in regard to criteria such as seek time, sequential read/write speed, or write amplification. The selected variant may involve a sequential or a non-sequential arrangement of sector data on adjacent tracks 3 or a combination of both.

Alternatively or additionally, the order of sector data may be managed dynamically, e.g., depending on free sectors available in the affected bands 18. Also, after the reconfiguration of a band 18, depending on the workload of the SMR hard disk drive 1, reorganizing the order of sector data may be done at a later point in time, e.g. as part of a "scrubbing operation" (garbage collection) during idle time, as described in the aforementioned patent U.S. Pat. No. 8,756, 399 B2.

Various embodiments of the present invention may be implemented regardless of the direction, orientation, and structure of the overlapping data tracks 17 and bands 18. For example, the overlapping data tracks 17 may be written from the outer diameter to the inner diameter of the disk surface 2, or from the inner diameter to the outer diameter.

Moreover, it is possible to combine both radial directions on the same disk surface 2, as is described in U.S. Pat. No. 8,699,185 B1, entitled "Disk drive defining guard bands to support zone sequentiality when butterfly writing shingled data tracks," the disclosure of which is hereby incorporated by reference in its entirety. A first zone (or band 18) may be written while seeking from track to track in a first radial direction resulting in data tracks 17 overlapping in the first radial direction and a second zone (or band 18) may be written while seeking from track to track in the opposite radial direction resulting in data tracks 17 overlapping in the opposite direction.

Figure 23:
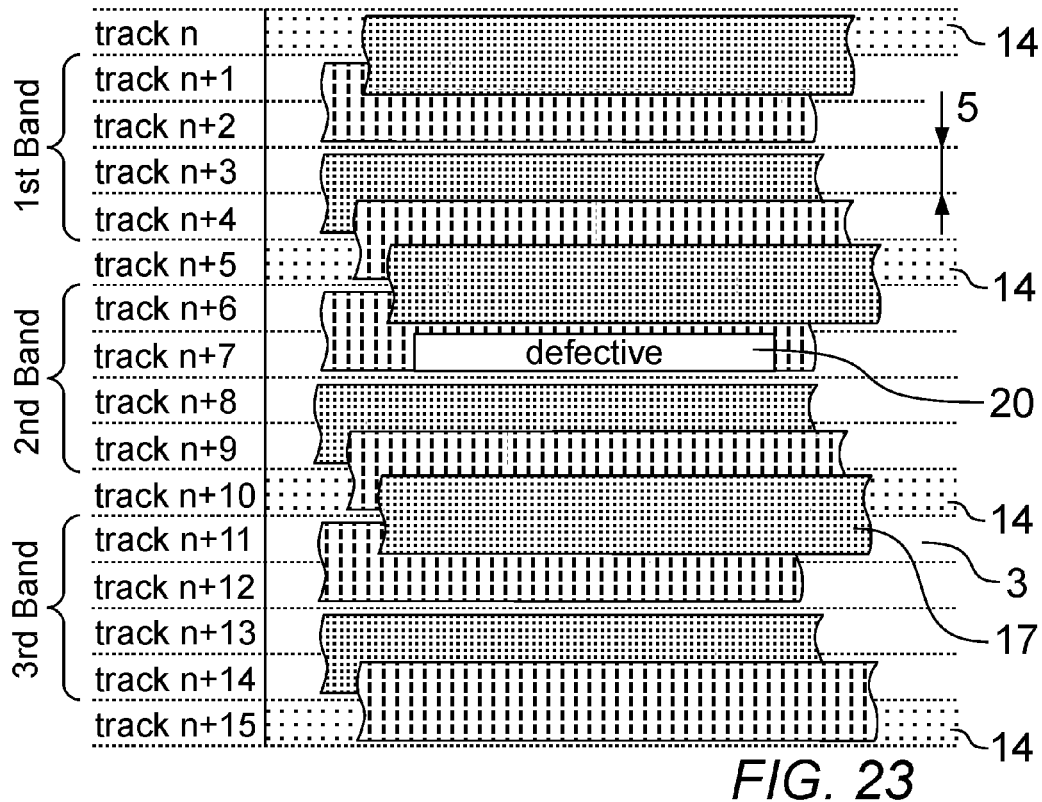
FIG. 23 shows symmetrical bands with a defective sector on track n+7 in the 2nd band.

Furthermore, a band 18 may comprise data tracks 17 with overlaps in both radial directions. The overlapping data tracks 17 may diverge in the middle of the band 18 (or at a location near the middle), e.g. track n+2 and track n+3 of the 1st band, as illustrated in FIG. 23. This type of band 18 is referred to herein as a "symmetrical band." Adjacent symmetrical bands 18 share a common guard region 14. For instance, the 1st and 2nd symmetrical bands, as per FIG. 23, share a guard track 14 on track n+5, which is used by the wide write element 15 from both sides. Symmetrical bands 18 may be useful to reduce the write amplification, since the number of tracks 3 that must be updated via read-modify-write is at least halved.

Figure 24:
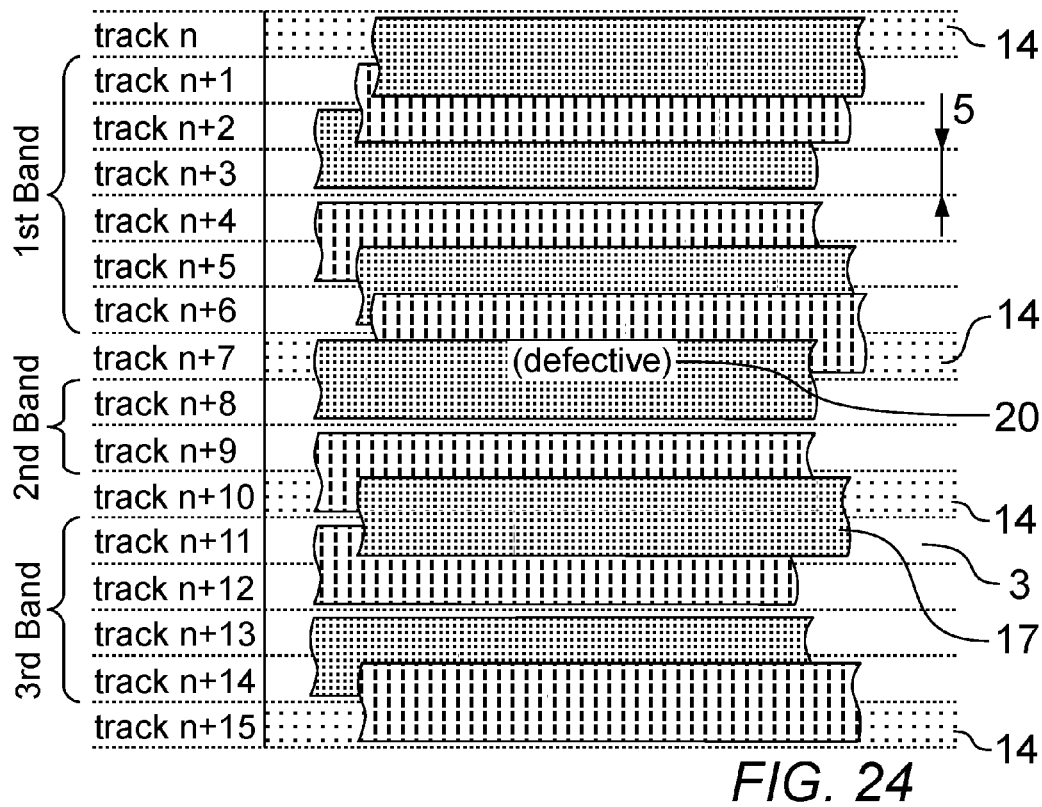
FIG. 24 shows the replacement of the defective sector in case of symmetrical bands.

The symmetrical bands 18, illustrated in FIG. 23, each comprise four tracks 3 in the initial state. At least one defective sector 20 is located on track n+7 in the 2nd band, which, by way of example, is "repaired" by displacing a guard track 14 from track n+5 to track n+7, as shown in FIG. 24. The width of the 1st band thus increases from four to six tracks (track n+1 to track n+6), and the width of the 2nd band is reduced from four to two tracks (track n+8 and track n+9). The boundaries of the 1st and 2nd band are shifted accordingly.

In order to preserve the symmetric structure of the overlapping data tracks 17 within the bands 18 even after changing the width of the bands 18, the line of symmetry of each affected band 18 may be shifted. For example, as seen in FIG. 24, the overlapping data tracks 17 now diverge between track n+3 and track n+4 in the 1st band and between track n+8 and track n+9 in the 2nd band. The reconfiguration is achieved by reading, buffering, and rewriting the sector data of the corresponding tracks 3. Despite the fully occupied symmetrical bands 18 all sector data is still accommodated, even after the reconfiguration.

Further variations and embodiments are possible. For instance, instead of writing diverging data tracks 17 from the line of symmetry toward the outer band boundaries, the overlapping data tracks 17 may be written from the outer band boundaries toward a guard region 14 located in the middle (or near the middle) of the symmetrical band 18. Even in this case, it is possible to "repair" a defective sector 20 within the band 18 by placing the guard region 14 onto the track 3 with the defective sector 20, which is not necessarily a track 3 in the middle of the band 18. The entire sector data of the affected band 18 can be accommodated by adjusting the order and/or the overlaps of the data tracks 17 within the band 18.

As disclosed above, if a defective sector 20 is found, the upper and/or lower boundaries of the affected band 18 may be adjusted, which, in particular, may be done for the entire length of the tracks 3. E.g., when displacing a track 3 or guard track 14, this may be done for all sectors 4 of the track 3 or guard track 14. Whereas, in a third embodiment, as per FIG. 25 and FIG. 26, only individual sections of the tracks 3, typically sectors 4, are displaced to alternate tracks 3.

Figure 25:
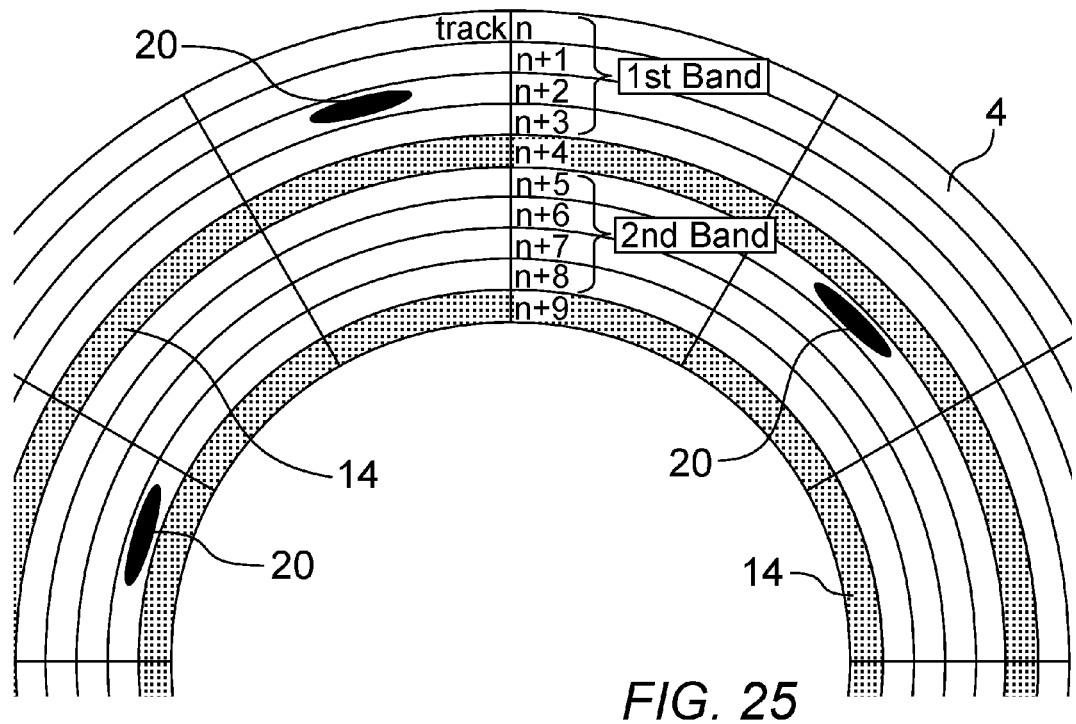
FIG. 25 illustrates a disk surface with three defective sectors on the concentric tracks.

In the example illustrated in FIG. 25, the bands 18 have a width of four tracks 3 in the initial state, however, any other desired width is possible. Furthermore, FIG. 25 shows physical sectors 4, depicted as sections, on concentric tracks numbered n through n+9. Defective sectors 20, represented by a solid black ellipse, are located on track n+2 (left of center), track n+5 (right of center), and track n+8 (left of center).

Figure 26:
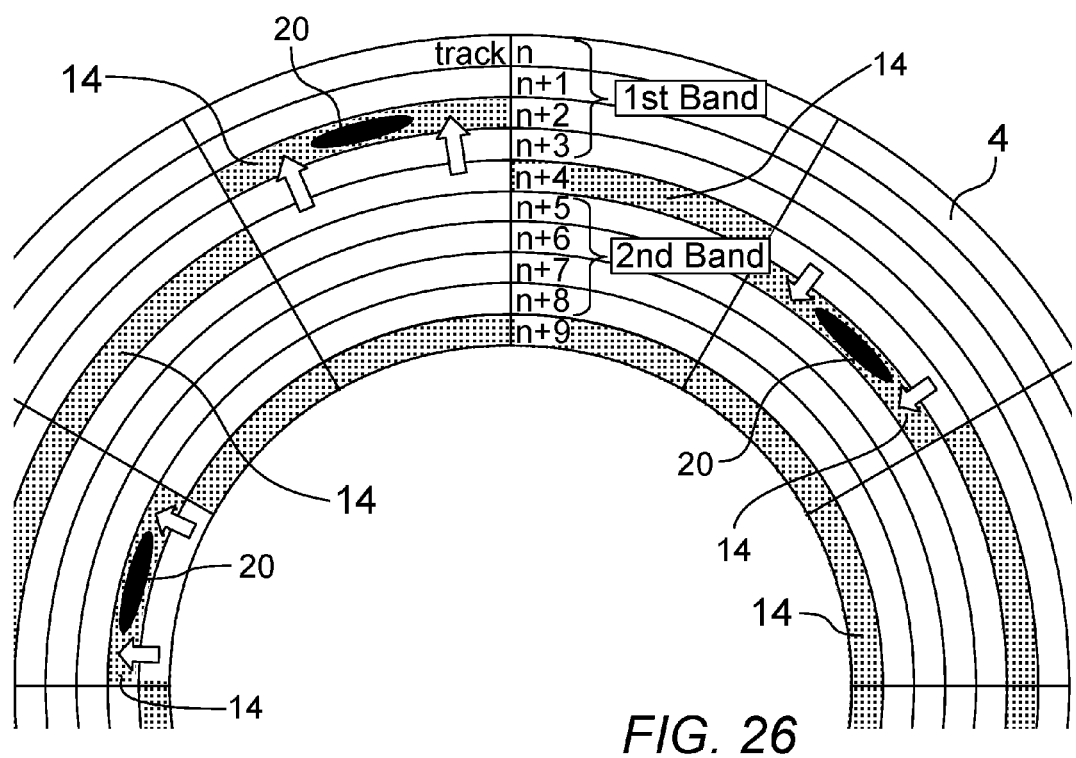
FIG. 26 illustrates the displacement of individual guard segments.

As a means of "repair," as shown in FIG. 26, it is not the entire guard track 14 that is displaced, but rather at least one sector 4 that acts as a distancing gap segment, i.e., a segment of a guard track 14, hereinafter referred to as "guard segment" 14. Moreover, the boundaries of the bands 18 are individually shifted per circle sector.

Concerning the defective sector 20 on track n+2, according to FIG. 25, the closest guard segment 14 is located on track n+4. This is the lower boundary of the 1st band. As shown in FIG. 26, only a guard segment 14 is shifted from track n+4 to track n+2, whereby the action is limited to a single circle sector. The remaining guard track 14 in the other circle sectors remains in its old position on track n+4. A further defective sector 20 is located on track n+5. Accordingly, in FIG. 26, the corresponding guard segment 14 is displaced from track n+4 to track n+5, thus onto the defective sector 20. The same procedure occurs with the defective sector 20 on track n+8: The adjacent guard segment 14 on track n+9 is displaced onto the defective sector 20 on track n+8.

In the third embodiment, the bands 18 or, more specifically, the displaced sectors 4 and guard segments 14, may likewise be maintained in an extended G-list, which is, however, done separately for each circle sector on the disk surface 2. Also, in the third embodiment, a guard segment 14 may swap position with the sector data of a defective sector 20, while all other sector data remains in its old position, that is, the sequential order of the sector data is not preserved. This corresponds to the example illustrated in FIG. 21 and FIG. 22. Depending on whether the preservation of the sequential order of sector data is beneficial for access times and/or desirable for some other reason, those skilled in the art will decide on an appropriate variant.

As disclosed above, the location of a former guard region 14 may be used as a replacement for storing user data, for instance, to accommodate data from a defective sector 20, or to accommodate the entire contents of a track 3 having at least one defective sector 20.

Whereas, in a fourth embodiment, the sector data located on a newly discovered defective sector 20 (grown defect), or the sector data located on an entire track 3 affected by such a defective sector 20, is stored in a spare sector area in a conventional manner. The defective sector 20 or the entire track 3, on which at least one defective sector 20 is located, is instead used as an additional guard segment or guard track 14.

By dividing the affected band 18 and by introducing an additional guard segment or guard track 14 on the track 3 with the defective sector 20, two "sub-bands" with a reduced number of tracks 3 are created. The lower track count per "sub-band" may reduce the write amplification e.g., in the case of random write access.

Figure 27:
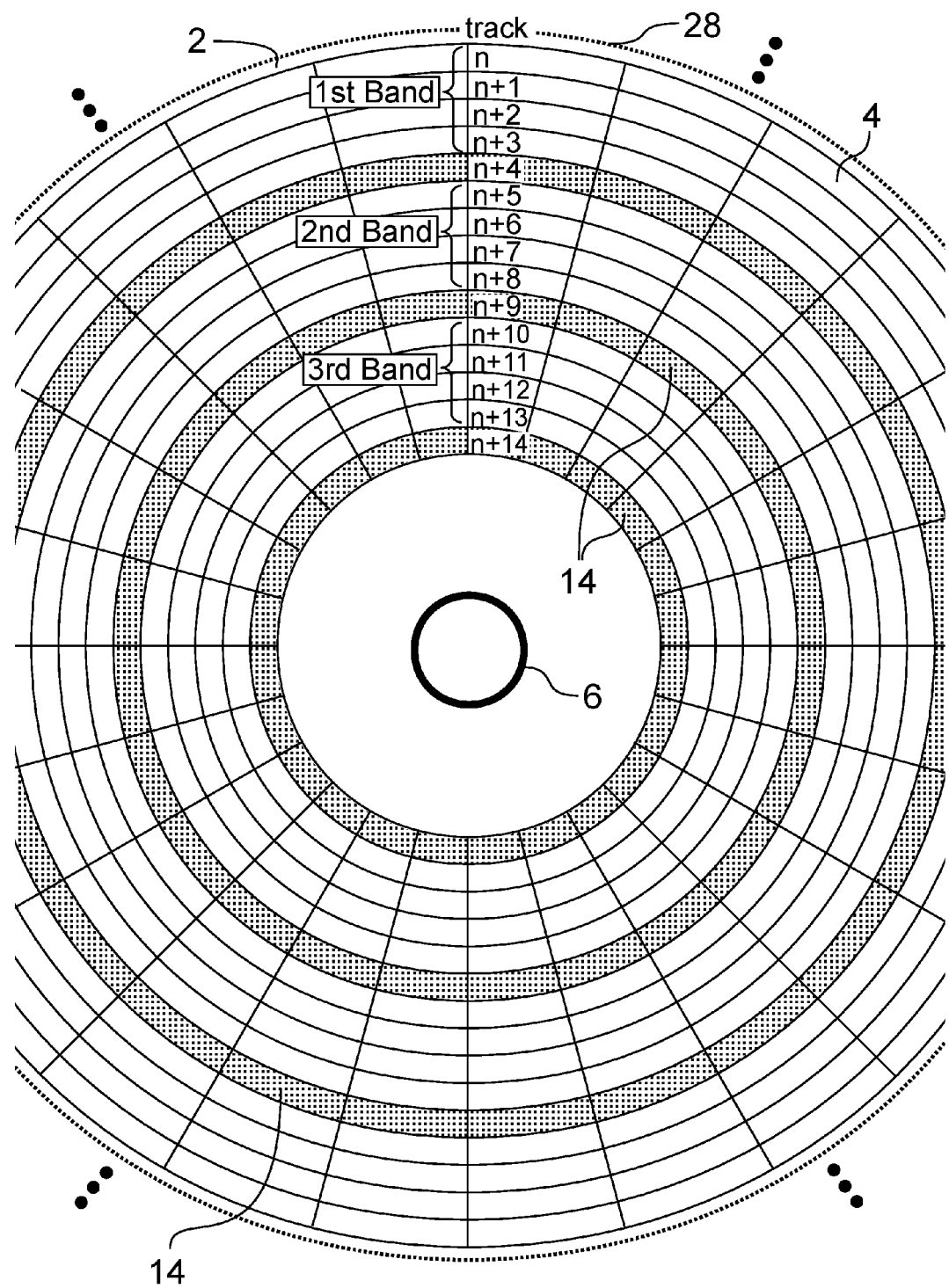
FIG. 27 shows the innermost zone of a disk surface consisting of three bands.

The hard disk geometry and structure, i.e., the division of the hard disk 1 into zones 28, bands 18, tracks 3, physical sectors 4 as well as cylinders 12 and read/write heads 8, may be defined and stored as part of the firmware data of the hard disk controller 10. FIG. 27 shows, by way of example, the innermost zone 28 on a disk surface 2 and a conventional, evenly spaced arrangement of guard tracks 14. The innermost zone 28 comprises tracks 3, numbered from n to n+14. Track numbers smaller than n are thus representative of the tracks 3 of the outer zones 28 that are not shown in the drawings.

For illustrative purposes, a low number of tracks 3 is chosen in the drawings, which should not be construed as limiting the scope of the embodiments. As shown in FIG. 27, the innermost zone 28 is divided into three bands 18, wherein each band 18 consists of four tracks 3 and is separated by a guard track 14. Such an arrangement may be defined and stored in the firmware of the hard disk controller 10 and/or may be stored in a special firmware data section on a disk surface 2.

When producing a hard disk drive 1, there are typically defective sections 20 on the new disk surfaces 2. These defective sections 20 may have been recognized as potentially defective sectors 20 during the production process (e.g., servowriter, "low-level format," test-phase, etc.) and are known as "primary defects." Primary defects may be skipped by means of a technique known as "sector slipping" or "slipping." Since the hard disk drive 1 is still empty at this stage, a defective sector 20 can be omitted by assigning the logical block address of the defective sector 20 to the next physical sector 4 and shifting the addresses of all subsequent sectors 4 by one. The sequential order of the sector data on the tracks 3 is preserved. The assignment of logical block addresses to physical sectors 4 ("logical block addressing," LBA) may be stored in a so-called P-list (primary defects list) as part of the firmware data. In order to skip primary defects in the manner described, spare areas must be reserved on the disk surfaces 2 of the hard disk drive 1 to compensate for the "lost" defective sectors 20. This approach is state of the art.

Figure 28:
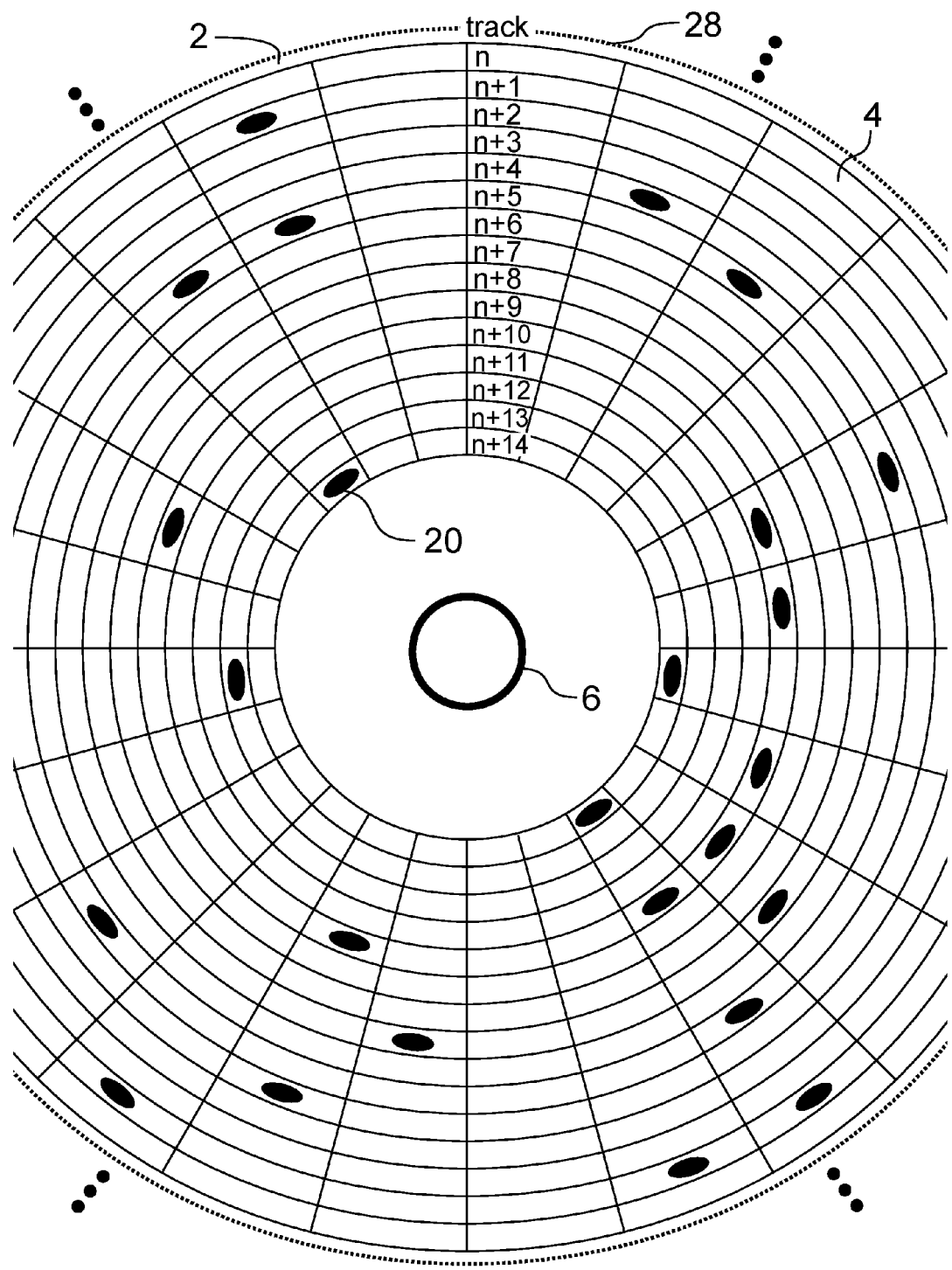
FIG. 28 shows the innermost zone of a disk surface having various primary defects.
Figure 29:
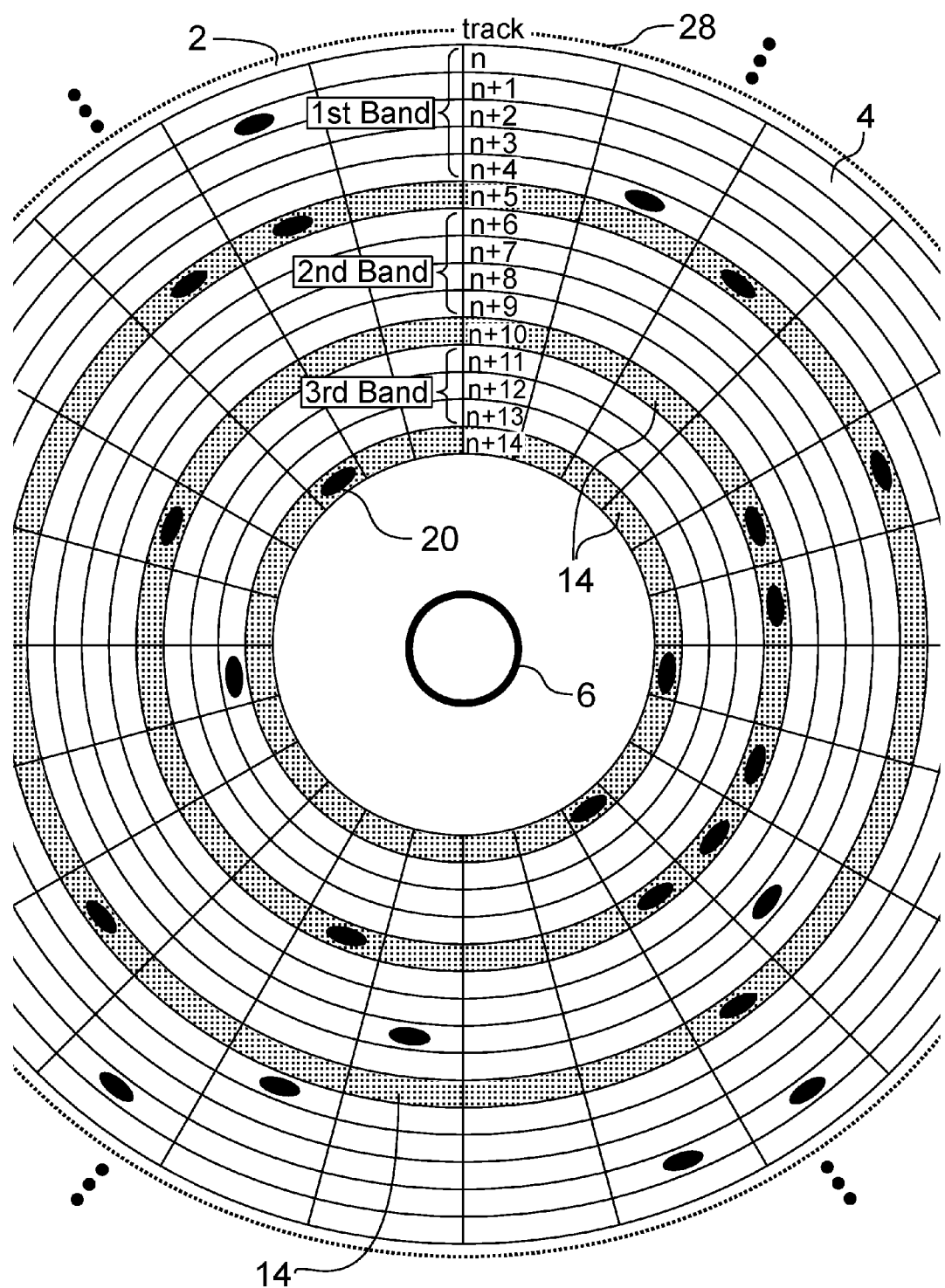
FIG. 29 shows guard regions that have been placed on tracks with an elevated error count.

FIG. 28 and FIG. 29 show a fifth embodiment. Defective sectors 20 are located on the innermost zone 28 of a disk surface 2. The innermost zone 28 corresponds to the zone 28 depicted in FIG. 27. The defective sectors 20, as per FIG. 28, are illustrated as solid black ellipses and may have been identified during the production of the hard disk drive 1. For instance, track n+1 contains four defective sectors 20, whereas track n is error-free. For illustrative reasons, it is assumed in the following that there are no defective sectors 20 in the areas cut-off at the right and left of the drawings.

In a conventional arrangement as per FIG. 27, a guard track 14 may be placed on every fifth track 3 in compliance with the specification that the bands 18 are four tracks 3 wide. The positions of defective sectors 20 are not taken into account.

Whereas, in accordance with one aspect of the invention, in the fifth embodiment as per FIG. 29, the width of each band 18 is varied in such a way that the guard regions 14 are located, as often as possible, on tracks 3 with an increased number of defective sectors 20. Limits may be defined as to the minimum and maximum permissible number of tracks 3 in a band 18. In the illustrated example, while the target value could be four tracks 3 per band 18, the minimum permissible width of a band 18 could be three tracks 3, and the maximum could be five tracks 3.

As illustrated in FIG. 28, there are no defective sectors 20 on track n+9, which was originally intended for the guard track 14 as per FIG. 27, but there are a total of seven defective sectors 20 on track n+10. Therefore, as shown in FIG. 29, it is advisable to use track n+10 as a guard track 14 because the defective sectors 20 on track n+10 have no relevant disadvantages for a guard track 14. As a result, the 3rd band now consists of merely three tracks 3. Since the defective sectors 20 are now located on a guard track 14, there is no need to remap these defective sectors 20 to a spare area. The size of spare areas on the disk surfaces 2 can be reduced; the total capacity of the SMR hard disk drive 1 increases. However, if the originally intended track n+9 were to be used for the guard track 14, the defective sectors 20 would be reflected as a loss in capacity.

Defective sectors 20 that cannot be covered by a guard region 14 due to their position, or due to limits such as the minimum and maximum permissible number of tracks per band 18, may be skipped by means of "sector slipping" in a conventional manner. Both the optimized positions of guard regions 14, as well as the defective sectors 20 skipped over by means of "sector slipping," can be stored in an extended P-list.

Figure 30:
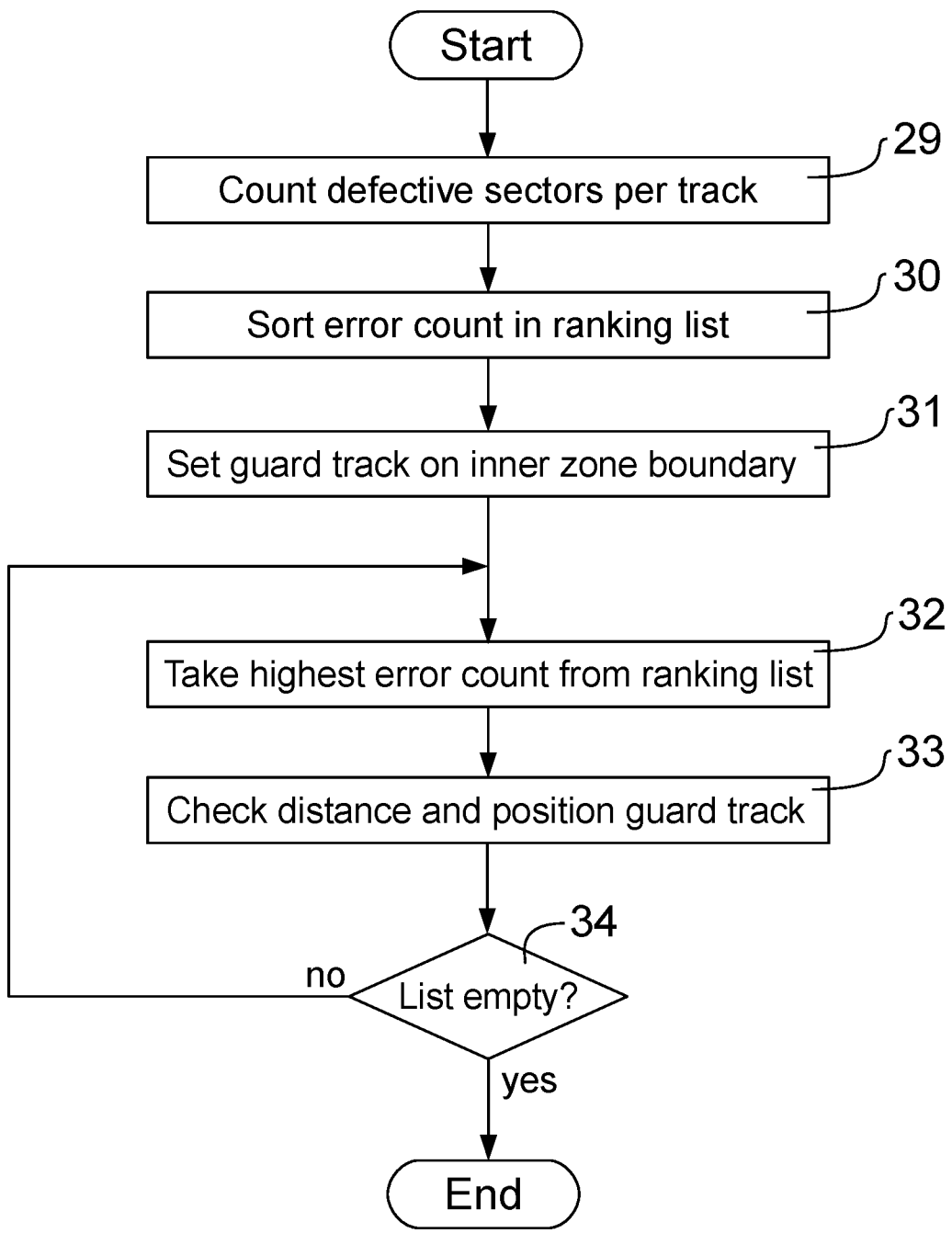
FIG. 30 is a flowchart showing a heuristic optimization process.

The flowchart of FIG. 30 shows a simple heuristic method for finding advantageous tracks 3 for the guard regions 14 in the production of SMR hard disk drives 1. The starting point may be a test or scan of all physical sectors 4 on the hard disk drive 1 by which all defective sectors 20 are detected.

The final result of the optimization procedure, that is, the optimized positions of the guard regions 14, may be stored in an extended P-list (primary defects) analogously to the procedure according to FIG. 11 and FIG. 12. The extended P-list may contain the track numbers of all guard regions 14. The new, optimized position and width of the corresponding bands 18 may then be obtained indirectly from the stored positions of the guard regions 14.

The optimization procedure depicted in FIG. 30 may be performed separately for each zone 28 of each disk surface 2. First, in step 29, the error count per track 3 is determined by counting the defective sectors 20 of each track 3. Next, in step 30, the error count per track 3 is sorted by size for all tracks 3 in a zone 28 so that the track 3 with the most defective sectors 20 ranks first in a ranking list.

On the innermost track 3 of the zone 28 (or outermost track 3 of the zone 28, depending on the direction of SMR overlaps), a finishing guard track 14 is positioned by entering the corresponding track number into the extended P-list. This is done in step 31 of the flowchart. The innermost (or outermost) track 3 is typically the track 3 with the largest (or smallest) track number within the zone 28, and is located at the zone boundary.

In step 32, the track 3 with the highest error count (first entry) is taken from the ranking list and is removed from the ranking. Each track 3 taken from the ranking list is a candidate for the position of another guard track 14. The corresponding track number of such a track 3 may then be stored in the extended P-list as an optimized location for a guard track 14.

In step 33, it is checked, whether there is already an entry in the extended P-list referencing a guard track 14 located at a distance of less than the minimum permissible width of the bands 18, i.e., starting from the candidate's track number, it is checked for both sides whether a guard track 14 on an adjacent or local track 3 has already been entered into the extended P-list or whether the candidate is located too close to the outer (or inner) zone boundary. If minimum spacing to adjacent guard tracks 14 and boundaries is ensured, the track number of the candidate is entered into the extended P-list as a new guard track 14; otherwise, the candidate is discarded.

Steps 32 and 33 are repeated until the ranking list is empty. This is controlled by means of the conditional construct in step 34. The lower entries in the ranking list typically have an error count of zero. These entries fill in the spaces between already placed guard tracks 14 in the further course of the process, always in accordance with the minimum distance to the nearest guard track 14 or band boundary. The steps of the flowchart can be comprehended in more detail by means of the example shown in FIG. 28 and FIG. 29.

Optionally, the process described above could be further optimized. E.g. instead of using the lower entries from the ranking list (with an error count of zero) to fill in the spaces between already placed guard tracks 14, these error-free entries may be skipped or deleted from the ranking list. Instead, in a final step, the remaining spaces between already placed guard tracks 14 (having an error count greater than zero) can be filled with evenly distributed guard tracks 14, ensuring that the width of the corresponding bands 18 is close to the target value.

The optimization of the location and distribution of guard tracks 14, as described above, is performed separately per zone 28. This ensures that each track 3 within a zone 28 owns the same number of physical sectors 4, thereby allowing the direct comparison of the number of defective sectors 20 per track 3. Otherwise, if the number of physical sectors 4 per track 3 varies in the considered region, the number of defective sectors 20 per track 3 must be put in relation to the number of physical sectors 4 per track 3.

As an alternative to the basic optimization process shown in FIG. 30, a variety of known methods for solving the optimization problem can be used, in particular, approximation algorithms and heuristics from the fields of mathematical optimization, algorithmic discrete mathematics, and integer programming. Optionally, the constraints pertaining to the objective function of the optimization algorithm may be weighted differently, such as the minimum and maximum numbers of tracks 3 per band 18 and the uniform distribution of guard regions 14.

Another criterion that may be incorporated into the optimization process is the quality level of tracks 3 and/or the severity level of defective sections 20. In particular, the optimization algorithm may distinguish between unreliable sectors 20 and defective sectors 20. Furthermore, an assessment of how critical the situation is to be interpreted in adjacent physical sectors 4 of the same track 3 and/or on adjacent tracks 3 can help to make an optimal decision as to on which track or tracks 3 a guard track or guard region 14 should be positioned. E.g., supposing a track 3 is affected by a defective sector 20, in case adjacent physical sectors 4 on the same track 3 are of marginal reliability, this suggests that this track 3 should be selected for a guard track 14.

Also, rather than counting the number of defective sectors 20 per track 3 the optimization algorithm may consider the length or percentage of defective sections 20 on the tracks 3. The length of defective sections 20 may be rated or weighted by severity level.

The application of the optimization process pursuant to FIG. 29 and FIG. 30 is not limited to the production stage of an SMR hard disk drive 1. Optionally, the end user can be provided with an optimization tool, e.g., as a software application. Software tools for reinitializing a hard disk drive are known and are state of the art, e.g. zero-fill diagnostic utilities, "low-level format," and "mid-level format." Defective sectors 20 can be detected and "fixed." As part of such a surface diagnosis and reformatting, the software tool can also perform an optimization on the position and/or distribution of the guard regions 14, as described above. The end user, therefore, has the option to restore an SMR hard disk drive 1 that has been in operation for a long time back into a clean and well performing state.

Concerning the aforementioned embodiments, a read/write head 8 is used having a write element 15 twice as wide as the read element 16. However, other embodiments may have a different ratio in regard to the width of the read- and write element 15, 16. Generally speaking, the track width of the write element 15 can be any value greater than the track width 5 of the read element 16.

Figure 31:
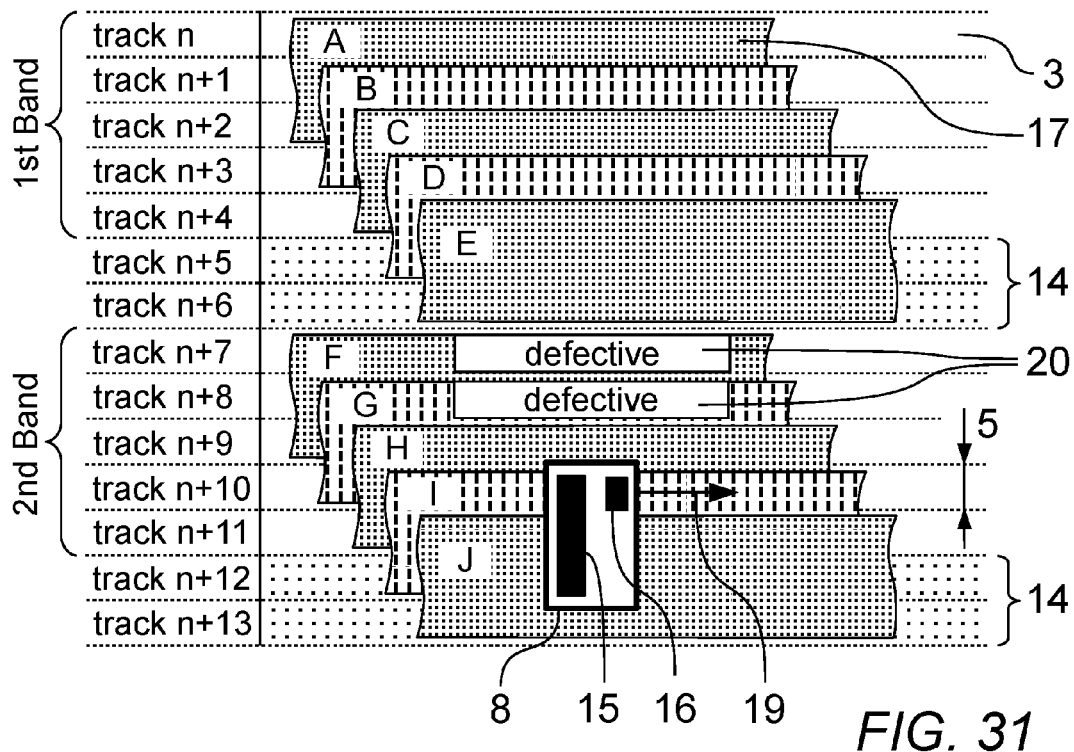
FIG. 31 shows two bands with defects on adjacent tracks and illustrates the width of a read element and a write element having a ratio of 1:3.
Figure 32:
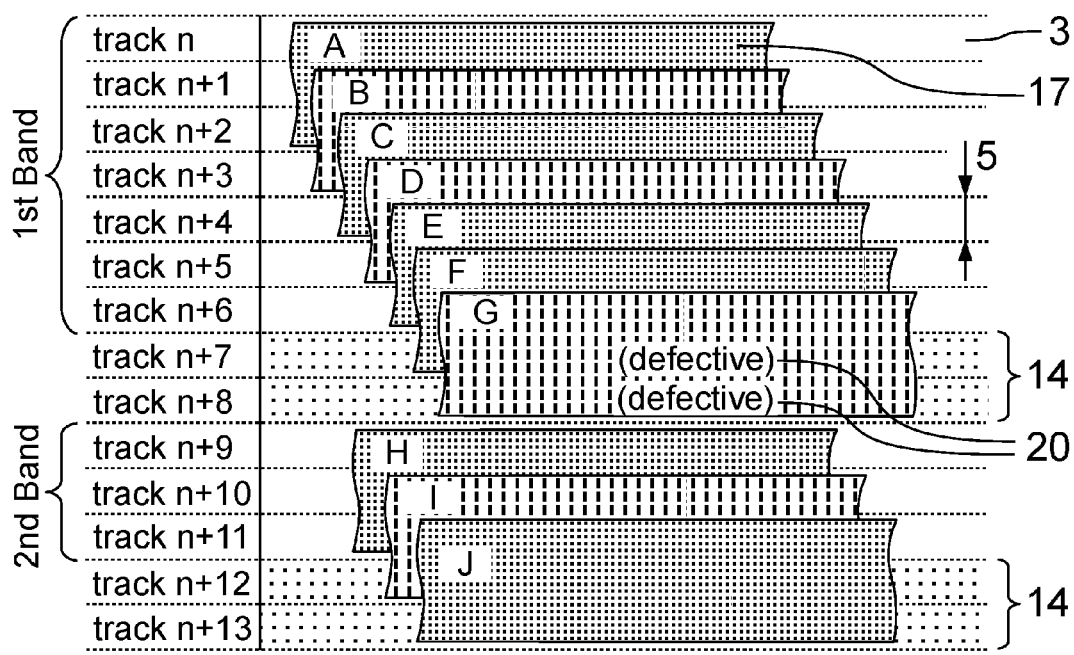
FIG. 32 shows the replacement of two defects on adjacent tracks with a single guard region.

By way of example, in a sixth embodiment pursuant to FIG. 31 and FIG. 32, the track width of the write element 15 is three times the track width 5 of the read element 16. The two bands 18 depicted in FIG. 31 each have five tracks 3. The guard region 14 consists of two adjacent tracks 3, being twice as wide compared to aforementioned embodiments. This is essential to prevent the write element 15 (now three times as wide) from writing onto the first track 3 of the next band 18.

As shown in FIG. 31, defective sectors 20 are located in the 2nd band on each of the tracks n+7 and n+8, thus two errors on two adjacent tracks 3. Because the guard region 14 in this embodiment consists of two adjacent tracks 3, it is still sufficient, to shift only one band boundary. This distinguishes the sixth embodiment from those aforementioned.

FIG. 32 illustrates, by way of example, how merely the upper band boundary of the affected 2nd band is shifted to "repair" the band 18. For this purpose, the guard region 14, consisting of two tracks 3, is displaced from the pair of tracks n+5 and n+6 to the pair of tracks n+7 and n+8, such that the guard region 14 covers both defective sectors 20.

Optionally, a uniform distribution of the number of tracks 3 per band 18 may be applied analogous to the example shown in FIG. 16. This has been omitted in FIG. 32 due to space demands and should not be construed as limiting the scope of the embodiment.

A guard region 14 consisting of two tracks 3, as illustrated in FIG. 31 and FIG. 32, may also be applied in a similar manner with all other embodiments presented, as well as with further embodiments. This may be done whenever the track width of the write element 15 is three times as wide as the track width 5 of the read element 16. Also, a guard region 14 may consist of more than two tracks 3 and/or the width of the write element 15 may be even wider.

It is to be explicitly noted that the guard regions 14 in the fifth embodiment pursuant to FIG. 29 may also comprise more than one track 3, and the write element 15 may have any suitable width. The aforementioned optimization algorithm may, in this case, consider the total number of defective sectors 20 of all tracks 3 covered by the width of the guard region 14. Also, the optimization algorithm may consider the size or percentage of defective disk surface 2, in terms of the square measure, that can be covered by the guard region 14. In general, the size, the width, or the severity level of a primary defect may be taken into account.

Furthermore, as mentioned above, the quality level of physical sectors 4 on adjacent tracks 3 may be taken into account while performing the optimization. E.g., supposing there is a defective sector 20 on a track 3 with the track number n, no defects on the upper adjacent track n−1, and a physical sector 4 of marginal quality on the lower adjacent track n+1, than it would be advantageous to position a guard region 14, consisting of two tracks 3, on the pair of tracks n and n+1 in order to use the opportunity to also exclude the physical sector 4 of marginal quality on track n+1. (Not shown in the drawings.) This optimization is possible without losing storage capacity.

Pursuant to some disclosed embodiments, the width of a guard region 14 is equal to the track width 5 or a multiple of the track width 5. Therefore, a guard region 14 may fit precisely into the grid of tracks 3. However, in other embodiments, guard regions 14 with different widths may be implemented that are expressly not multiples of the track width 5, but which, for example, are 1.5 times or 2.5 times the width of a track 3. It is to be explicitly noted that the present disclosure is not limited to guard regions 14 consisting of one or two tracks 3, as depicted in the drawings. A guard region 14 may have any suitable width. Also, the width of a guard region 14 may be increased to enhance the reliability of stored data.

Optionally, the width of guard regions 14 may be varied individually or dynamically to take account of the severity level of defects, such as the size or width of defective sections 20 and/or the number of defective sectors 20 on a track 3. E.g., in the fifth embodiment, as part of the optimization process, the width of each guard region 14 may be adjusted individually, to optimally cover primary defects. The resulting width of the guard region 14 after the optimization may be any size and needs not be a multiple of the track width 5. In this case, the subsequent tracks 3 may be shifted corresponding to the optimized width of the preceding guard region 14. Such a procedure of shifting tracks 3 may be applicable, e.g. as part of a "low-level format," since the hard disk drive 1 does not contain any user data at the time of production.

Typically, a SMR hard disk drive 1 comprises several disk surfaces 2 mounted on top of one another in a disk stack 13. In the aforementioned embodiments, guard regions 14 and bands 18 are individually reconfigured per disk surface 2. This means that each disk surface 2 may have individually positioned guard regions 14 and bands 18, which are adjusted to local conditions (such as defective sectors 20) and which may vary from disk surface 2 to disk surface 2 in the disk stack 13.

Alternatively, all aforementioned embodiments and further embodiments may be implemented in such a way that the reconfiguration of the position of guard regions 14 and band boundaries is done uniformly in the entire disk stack 13 on all disk surfaces 2 (or at least on more than one disk surface 2). E.g., with respect to the first, second, and third embodiments, as soon as a defective sector 20 is detected on one of these disk surfaces 2, the corresponding guard regions 14 and band boundaries shift position in the entire disk stack 13 on all disk surfaces 2. After the reconfiguration, all corresponding guard regions 14 in the disk stack 13 are located above one another throughout the same cylinder 12.

The reconfigured guard regions 14 and/or bands 18 may be maintained in an extended G-list analogously to the procedure in the previous embodiments. Yet, in this case, the extended G-list stores cylinder numbers (instead of track numbers), which may constitute obligatory locations for guard regions 14 and band boundaries on more than one disk surface 2.

Also, those skilled in the art will recognize that, in the fifth embodiment pursuant to FIG. 29, optimizing the distribution of guard regions 14 need not necessarily be done separately per disk surface 2. The position of guard regions 14 can also be varied in such a way that they are located, as often as possible, on a cylinder 12 (or several adjacent cylinders 12, depending on the width of the guard region 14), whose total number of defective sectors 20 is significantly increased throughout the entire disk stack 13.

In such an embodiment, the track numbers n through n+14 as per FIG. 28 and FIG. 29 may be interpreted as cylinder numbers n through n+14, and the solid black ellipses may represent the defective sectors 20 from the entire disk stack 13. That is, in the illustrations, every defective sector 20 from any disk surfaces 2 is indicated on a per cylinder 12 basis, regardless of the specific disk surface 2 from where the error is derived. For example, in such an embodiment, cylinder n is entirely error-free and cylinder n+1 contains four defective sectors 20 as the sum from all disk surfaces 2.

Finally, for such an embodiment, the flowchart depicted in FIG. 30 may be modified to find cylinder numbers that are favorable for guard regions 14. By way of example, an error count per cylinder 12 may be determined by counting the defective sectors 20 on all tracks 3 of the same cylinder 12 in the entire disk stack 13. The error count per cylinder 12 may be sorted by size for all cylinders 12 in a zone 28. The guard tracks 14 may be positioned on each disk surface 2 of the disk stack 13 by entering the corresponding cylinder number into a joint P-list.

It is to be explicitly noted that all examples shown in the drawings can, in a similar manner, also be carried out with any other embodiment, as well as with further embodiments. Therefore, the examples are universally applicable. Shifting band boundaries, the displacement of guard regions, guard tracks, and/or guard segments 14, as well as the rearrangement of sector data are possible, regardless of whether the underlying organization of the bands 18 is implemented per circle sector, per disk surface 2, or by using an entire disk stack 13.

The present invention may, inter alia, be used during the production of a hard disk drive 1 in order to map out primary defects or during regular operation of the hard disk drive 1 in order to "repair" grown defects. Alternatively the present invention may be used for both during the production as well as during regular operation. In this case, when optimizing the locations of the guard regions 14 during the production by placing them onto tracks 3 with an elevated number of primary defects, the manufacturer may mark off each guard region 14 that includes such primary defects. E.g., guard regions 14 that include at least one primary defect may be listed in a suitable table, such as an extended P-list and/or may be marked with a flag. This is done to indicate that a marked guard region 14 should not be used for the replacement of grown defects during the regular operation of the hard disk drive 1. Instead, another non-marked guard region 14 from the vicinity may be used to replace a new grown defect (such as a newly discovered defective sector 20). This approach corresponds to the case of a band 18 having defective sectors 20 on more than one track 3 as described with reference to FIG. 14 through FIG. 20.

With regard to FIG. 14 through FIG. 20 as well as FIG. 31 and FIG. 32, it is to be explicitly noted that, if there are defective sectors 20 on two or more different tracks 3 on the same disk surface 2, it is not necessary that these defective sectors 20 are located "below each other," i.e. that they are located in the same circle sector. The two or more defective sectors 20 are depicted below each other in the drawings for better illustration. However, the two or more defective sectors 20 may be located at different locations anywhere on their respective tracks 3. Also, a single track 3 may have several defective sectors 20 at any locations on the track 3. The guard region 14 may then cover several defective sectors 20, and "repair" is still possible.

In case the upper or lower half of a band 18 is adjacent to a boundary that cannot be moved, such as the outer or inner diameter of the disk surface 2 or, depending on the embodiment, an immovable zone boundary, and in case a defective sector 20 is located close to the immovable boundary (i.e., located in the half of the band 18 that is adjacent to the immovable boundary), it is still possible to "repair" the band 18 by displacing the guard region 14 from the other band boundary onto the defective sector 20.

Moreover, it is possible to shift the boundaries between two zones 28 of the "zone bit recording" to cover a defective sector 20 by a corresponding guard region 14 or gap between the zone boundaries. Shifting zone boundaries may also be done to gain more leeway when adjusting or optimizing the number of tracks 3 per band 18. Optionally, each zone 28 may comprise one single band 18, whereby zone 28 and band 18 form a unit that is then jointly shifted, adapted, and/or managed in accordance with defective sectors 20.

Furthermore, some embodiments may use a variable number of bands 18. Depending on the distance between defective tracks 3, (i.e. tracks 3 with at least one defective sector 20,) additional bands 18 may be inserted or multiple bands 18 may be merged into a "super-band." The new arrangement of bands 18 may be re-numbered, if desired.

Optionally, one or more disk surfaces 2 of the hard disk drive 1 may be divided into areas with overlapping data tracks 17 and areas with conventional, non-overlapping tracks. The areas with conventional, non-overlapping tracks may be used as fast write caches. E.g., while the methods according to the present disclosure may be used to "repair" defective sectors 20 in the larger areas with overlapping data tracks 17, a conventional method may be used for the smaller areas with non-overlapping tracks. More information about combining overlapping and non-overlapping areas on a disk surface 2 may be found in patent application US2014/0006707 A1, entitled "ICC-NCQ Command Scheduling for Shingle-written Magnetic Recording (SMR) Drives," the disclosure of which is hereby incorporated by reference in its entirety.

For illustrative purposes, and to keep the number of depicted tracks 3 and/or physical sectors 4 manageable, all bands 18, zones 28, or other sections of the disk surfaces 2 shown in the drawings of the present disclosure comprise relatively few tracks 3 and/or physical sectors 4. It is to be expressly noted that actual embodiments may have very large track counts and/or sector counts and that all disclosed methods and devices can be implemented with any number of tracks 3 and/or physical sectors 4.

The embodiments disclosed herein describe the invention based on the example of an SMR hard disk drive 1. All embodiments and further embodiments can, however, also be implemented by means of other data carrier media, which work, by way of example, on magnetic or optical basis. Also, recording data on a data carrier media may be combined with or assisted by other known technologies, such as "Heat-Assisted Magnetic Recording" (HAMR), "Two-Dimensional Magnetic Recording" (TDMR), and/or "Bit Patterned Media" (BPM).

Although the description above contains many specificities, these should not be construed as limiting the scope of the embodiments but as merely providing illustrations of some of several embodiments. Thus, the scope of the embodiments should be determined by the appended claims and their legal equivalents, rather than by the examples given.

The conjunction "or," as used in the claims, shall be interpreted as an alternative between two (or more) features, such as alternative method steps, and shall not be construed to specifically exclude any "non-selected" feature (such as an "XOR" operator). A list of features connected with an or that starts with the phrase "at least" or that ends with the phrase "a combination thereof" covers both single features from the list as well as any groups of features thereof. Furthermore, the conjunction "or," as used in the claims, shall not be construed as a logical OR operator of a computer program: Even if a claim contains a condition, the conjunction or is intended to specify alternative features of the claim such as alternative method steps.

What is claimed is:

1. A method for replacing at least one defective section on a disk surface without using sector slipping and spare sectors, comprising:
    a) providing a plurality of tracks configured for shingled magnetic recording at least in an area of said disk surface, the tracks being grouped into bands by means of entire tracks designated as circular guard regions,
    b) determining that at least one defective section is located on a track in a first band,
    c) selecting the preceding guard region at least if said defective section is located in the upper half of said first band,
    d) selecting the succeeding guard region at least if said defective section is located in the lower half of said first band,
    e) displacing at least the selected guard region onto the physical location of said defective section, wherein the entire circular guard region is displaced in the radial direction of said disk surface such that the radius of the circular guard region is changed,
    f) converting the former physical location of said selected guard region into one or more newly constituted tracks and integrating said one or more newly constituted tracks into the regular tracks of a second band that is adjacent to said first band,
    g) storing data at least on said one or more newly constituted tracks.

2. The method of claim 1, wherein said bands are symmetrical bands whose overlapping data tracks diverge outward, approximately from a line of symmetry of each band, toward shared guard regions at the band boundaries, establishing overlaps in opposite radial directions within each symmetrical band, each band boundary being written such that the data track width of a write element is caught by a shared guard region from both sides.

3. The method of claim 2, further comprising:
    a) displacing at least one shared guard region onto the physical location of said defective section, the displacement taking place in the radial direction of said disk surface,
    b) adjusting the line of symmetry of the symmetrical bands that share said shared guard region, such that the overlapping data tracks diverge outward in opposite radial directions within each symmetrical band.

4. The method of claim 1, further comprising equalizing at least the track count of said second band by moving the guard region located between said second band and a third band that is adjacent to said second band and opposite to said first band, said guard region being moved to such an extent that the difference in the number of tracks per band is reduced.

5. The method of claim 1, further comprising displacing stored data that is located on tracks in the semi-open interval, starting from the former physical location of said selected guard region up to and including the new physical location of said selected guard region, by a number of tracks derived from the width of said selected guard region, preserving the sequential order of said stored data throughout.

6. The method of claim 1, wherein at least a part of the retrievable data, recovered from the track affected by said at least one defective section, is stored on the former physical location of said selected guard region.

7. The method of claim 1, wherein, in the case that two or more defective sections are located in said first band on adjacent tracks whose combined width is too large to be covered by a single guard region, both boundaries of said first band are pulled together entirely such that said first band is disbanded, the corresponding preceding guard region and the corresponding succeeding guard region being placed next to each other onto the physical locations of said two or more defective sections.

8. The method of claim 1, further comprising managing the occurrence of defective sections by maintaining a list that stores the positions of guard regions that cover tracks affected by defective sections, wherein the sector numbers of defective sections are not stored.

9. The method of claim 1, further comprising:
    a) scanning or testing the quality of said disk surface at least within said area,
    b) determining the quality of each track,
    c) placing, by means of an optimization algorithm, guard regions preferentially onto tracks of poor or marginal quality.

10. The method of claim 1, further comprising:
    a) detecting defective sections on the tracks of said disk surface at least within said area,
    b) counting the number of defective sections per track,
    c) placing, by means of an optimization algorithm, guard regions preferentially onto tracks that contain an elevated number of defective sections.

11. A method for replacing at least one defective section on a disk surface without using sector slipping and spare sectors, comprising:
    a) providing a plurality of tracks configured for shingled magnetic recording at least in an area of said disk surface,
    b) determining the quality level of each track within said area,
    c) sorting said plurality of tracks by quality level and selecting at least tracks with a low quality level by means of an optimization algorithm, taking into account the radial distances between the selected tracks such that defined criteria for the distribution of the selected tracks are met,
    d) placing guard regions at least on the selected tracks such that entire tracks are designated as circular guard regions.

12. The method of claim 11, wherein the width of each guard region is adjusted individually at least depending on the size, the width, or the severity level of at least one defective section covered by said guard region, subsequent tracks being shifted corresponding to the adjusted width of said guard region.

13. The method of claim 11, wherein the width of each guard region is adjusted individually at least depending on the quality level of adjacent tracks or track sections, subsequent tracks being shifted corresponding to the adjusted width of said guard region.

14. The method of claim 11, further comprising marking a guard region that is located on a track with at least one defective section as being immovable and as being unavailable for the replacement of a further defective section on a different track.

15. The method of claim 11, further comprising:
    a) determining the error count per track by counting the defective sections of each track in said area,
    b) sorting the error count per track by size for all tracks in said area so that the track with the most defective sections ranks first in a ranking list,
    c) selecting the track with the highest error count from said ranking list, removing the corresponding entry in said ranking list, and designating the selected track as a guard region if the radial distance to adjacent guard regions is permissible,
d) repeating step (c) at least until all entries with a high error count are removed from said ranking list.

16. A storage device capable of replacing at least one defective section on a disk surface without using sector slipping and spare sectors, comprising:
a) a plurality of tracks configured for shingled magnetic recording at least in an area of said disk surface, the tracks being grouped into bands by means of entire tracks designated as circular guard regions,
b) a write element, a read element, and
c) a control unit configured to:
   i) determine that at least one defective section is located on a track in a first band,
   ii) select the preceding guard region at least if said defective section is located in the upper half of said first band,
   iii) select the succeeding guard region at least if said defective section is located in the lower half of said first band,
   iv) displace at least the selected guard region onto the physical location of said defective section, wherein the entire circular guard region is displaced in the radial direction of said disk surface such that the radius of the circular guard region is changed,
   v) convert the former physical location of said selected guard region into one or more newly constituted tracks, which are integrated into the regular tracks of a second band that is adjacent to said first band,
   vi) store data at least on said one or more newly constituted tracks.

17. The storage device of claim 16, wherein said bands are symmetrical bands whose overlapping data tracks diverge outward, approximately from a line of symmetry of each band, toward shared guard regions at the band boundaries, establishing overlaps in opposite radial directions within each symmetrical band, each band boundary being written such that the data track width of said write element is caught by a shared guard region from both sides.

18. The storage device of claim 16, wherein said control unit further is configured to:
   i) displace at least one shared guard region onto the physical location of said defective section, the displacement taking place in the radial direction of said disk surface,
   ii) adjust the line of symmetry of the symmetrical bands that share said shared guard region, such that the overlapping data tracks diverge outward in opposite radial directions within each symmetrical band.

19. The storage device of claim 16, further comprising:
a) a number of defective sections distributed across said plurality of tracks,
b) a plurality of guard regions positioned as often as possible on tracks of poor or marginal quality, taking into account a minimum permissible number of tracks per band, a maximum permissible number of tracks per band, the quality level of each track, the quality level of adjacent tracks, the size of a defective section, the severity level of a defective section, or a combination thereof.

20. The storage device of claim 16, further comprising:
a) a number of defective sections distributed across said plurality of tracks, each track containing several defective sections, a single defective section, or no defective sections,
b) a plurality of guard regions positioned as often as possible on tracks with an elevated number of defective sections taking into account a minimum permissible number of tracks per band, a maximum permissible number of tracks per band, or a combination thereof.

21. The storage device of claim 16, wherein guard regions that cover at least one defective section are marked as being immovable and as being unavailable for the replacement of further defective sections.

22. The method of claim 1, wherein:
a) each guard region has an invariable sector count,
b) said area configured for shingled magnetic recording is configured without spare sectors,
c) each band has a variable storage capacity without a minimum storage capacity.

23. The method of claim 1, further comprising:
a) decreasing the track count of said first band by the number of tracks, by which said selected guard region is displaced,
b) reassigning payload data by moving allocations from said first band to said second band to such an extent that the decreased track count of said first band is compensated.

24. The method of claim 11, wherein:
a) said quality level is measured in the number of defective sections per track, the size of defective sections, the severity level of defective sections, or a combination thereof,
b) said optimization algorithm involves an approximation algorithm, a heuristic algorithm, or a combination thereof.

25. The storage device of claim 16, wherein:
a) each guard region has an invariable sector count,
b) said area configured for shingled magnetic recording is configured without spare sectors,
c) each band has a variable storage capacity without a minimum storage capacity,
d) said control unit further is configured to:
   i) decrease the track count of said first band by the number of tracks, by which said selected guard region is displaced,
   ii) reassign payload data by moving allocations from said first band to said second band to such an extent that the decreased track count of said first band is compensated.

* * * * *